(12) United States Patent
Shapery et al.

(10) Patent No.: US 8,820,246 B2
(45) Date of Patent: Sep. 2, 2014

(54) METHOD AND SYSTEM FOR TRANSPORTATION USING A RAIL STRUCTURE

(75) Inventors: Sandor Wayne Shapery, San Diego, CA (US); Bradley Hunter, Burlington, MA (US)

(73) Assignee: Sandor Wayne Shapery, San Diego, CA (US)

( * ) Notice: Subject to any disclaimer, the term of this patent is extended or adjusted under 35 U.S.C. 154(b) by 185 days.

(21) Appl. No.: 13/329,128

(22) Filed: Dec. 16, 2011

(65) Prior Publication Data

US 2013/0152813 A1 Jun. 20, 2013

(51) Int. Cl.
*B60L 13/04* (2006.01)

(52) U.S. Cl.
USPC ............ 104/286; 238/143; 238/149; 238/150

(58) Field of Classification Search
USPC .......... 104/281, 286; 238/122, 145, 147, 149, 238/143, 150
See application file for complete search history.

(56) References Cited

U.S. PATENT DOCUMENTS

| | | | |
|---|---|---|---|
| 933,294 A * | 9/1909 | Dargin | 238/149 |
| 3,569,804 A | 3/1971 | Studer | |
| 3,594,622 A | 7/1971 | Inagaki | |
| 3,694,041 A | 9/1972 | Studer | |
| 3,706,922 A | 12/1972 | Inagaki | |
| 3,780,668 A | 12/1973 | Schwarzler et al. | |
| 3,797,402 A | 3/1974 | Karch | |
| 3,797,403 A | 3/1974 | Schwarzler et al. | |
| 3,845,720 A | 11/1974 | Bohn et al. | |
| 3,911,828 A | 10/1975 | Schwarzler | |
| 3,924,537 A | 12/1975 | Matsui et al. | |
| 4,315,197 A | 2/1982 | Studer | |
| 4,324,185 A | 4/1982 | Vinson | |
| 5,009,865 A | 4/1991 | Boden et al. | |
| 5,360,470 A | 11/1994 | Ono et al. | |
| 5,372,636 A | 12/1994 | Gray et al. | |
| 5,379,864 A | 1/1995 | Colby | |

(Continued)

FOREIGN PATENT DOCUMENTS

| | | |
|---|---|---|
| DE | 212 558 C | 4/1908 |
| DE | 255 204 C | 4/1912 |

(Continued)

OTHER PUBLICATIONS

Invitation to Pay Additional Fees, dated Aug. 6, 2013, issued in PCT Application No. PCT/US2012/069246, filed on Dec. 12, 2012.

(Continued)

*Primary Examiner* — Zachary Kuhfuss
(74) *Attorney, Agent, or Firm* — Knobbe, Martens, Olson & Bear, LLP

(57) ABSTRACT

Methods and systems for transportation using a rail structure are disclosed. In one aspect, a track for use with at least one of a magnetic levitation vehicle and a rolling vehicle having one or more wheels is disclosed. The track includes a first head having a maximum lateral dimension, a second head having a maximum lateral dimension, and a connection portion extending between the first head and the second head. The first connection portion may have a maximum lateral dimension that is less than the maximum lateral dimension of the first head. The track may also include a base and a support extending between the second head and the base.

14 Claims, 17 Drawing Sheets

(56) References Cited

U.S. PATENT DOCUMENTS

| | | |
|---|---|---|
| 5,445,080 A | 8/1995 | Austin |
| 5,757,098 A | 5/1998 | Higuchi et al. |
| 5,923,109 A | 7/1999 | Higuchi et al. |
| 5,959,382 A | 9/1999 | Dauwalter |
| 6,101,952 A | 8/2000 | Thornton et al. |
| 6,268,673 B1 | 7/2001 | Shah et al. |
| 6,396,178 B1 | 5/2002 | Chiu |
| 6,977,451 B2 | 12/2005 | Onishi |
| 7,617,779 B2 | 11/2009 | Studer |
| 2006/0113848 A1 | 6/2006 | Studer |
| 2006/0243158 A1 | 11/2006 | Li |
| 2008/0223249 A1 | 9/2008 | Studer |
| 2009/0032350 A1 | 2/2009 | Shapery |
| 2010/0011986 A1 | 1/2010 | Pumpelly |
| 2010/0301979 A1 | 12/2010 | Studer et al. |

FOREIGN PATENT DOCUMENTS

| | | |
|---|---|---|
| DE | 21 63 217 A1 | 6/1973 |
| DE | 20 2005 011269 U1 | 9/2005 |
| JP | 58 144503 A | 8/1983 |
| WO | WO 01/96139 A2 | 12/2001 |
| WO | WO 2008/111697 A1 | 9/2008 |
| WO | WO 2011/015249 A1 | 2/2011 |
| WO | WO 2012/075039 A2 | 6/2012 |

OTHER PUBLICATIONS

International Search Report and Written Opinion dated Oct. 31, 2013, issued in International Appl. No. PCT/US2012/069246, filed on Dec. 12, 2012.

\* cited by examiner

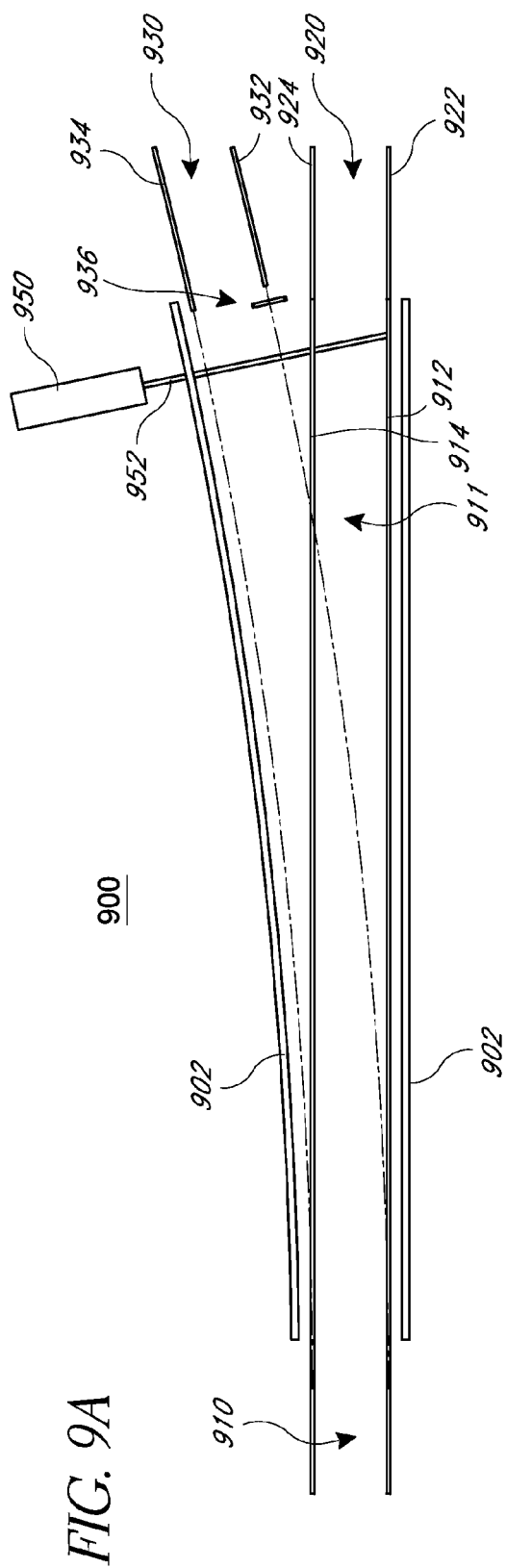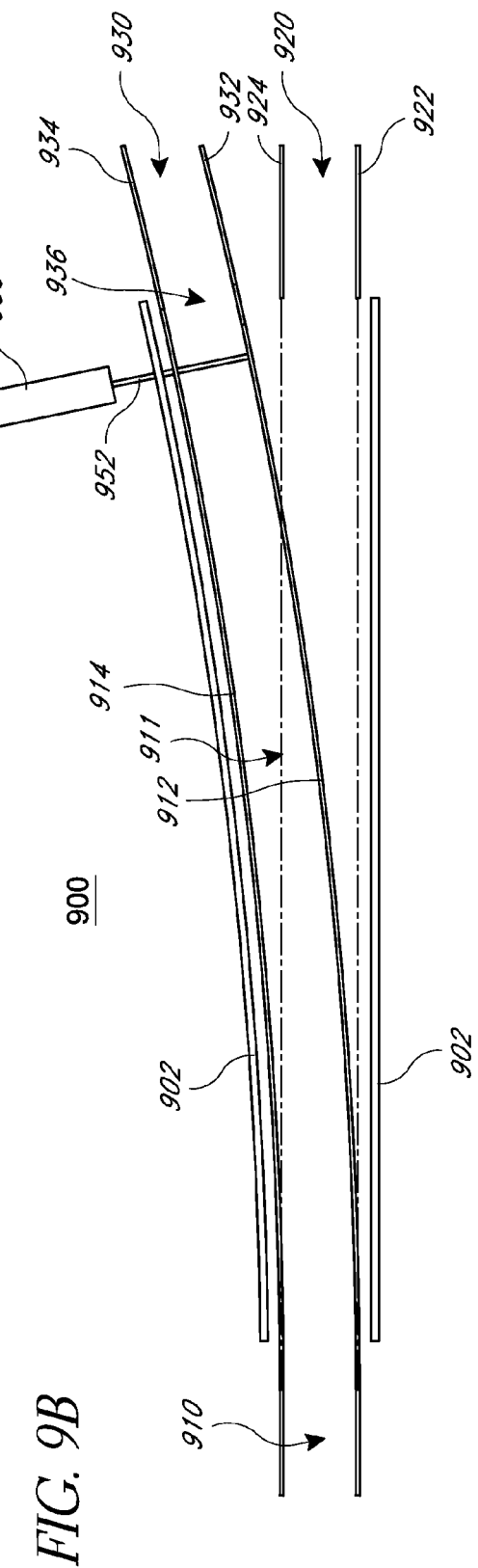

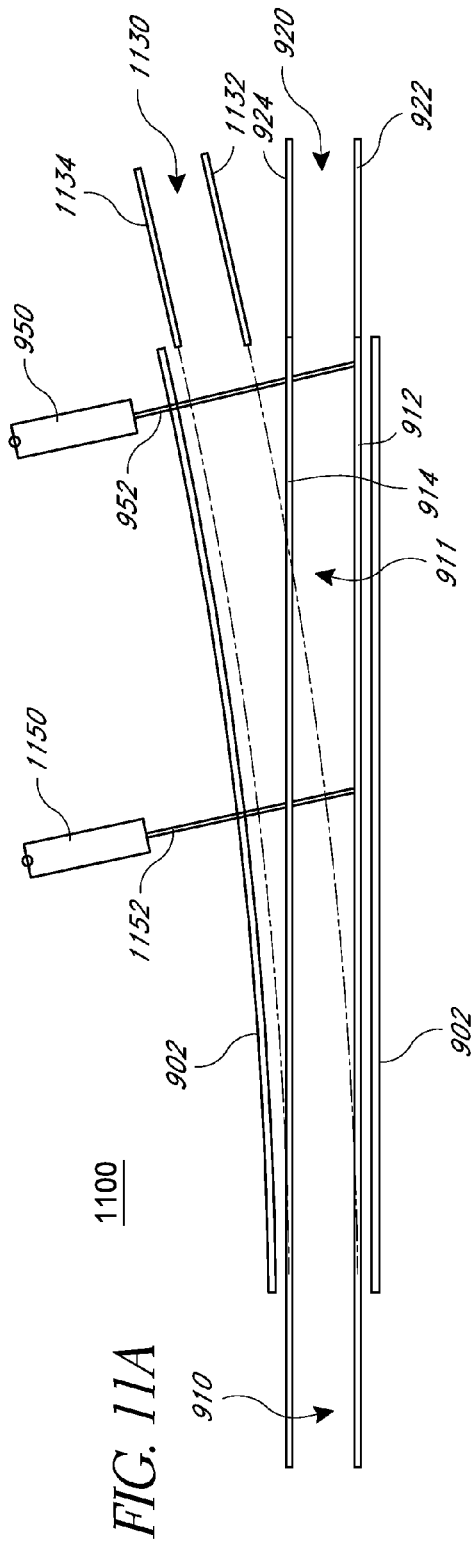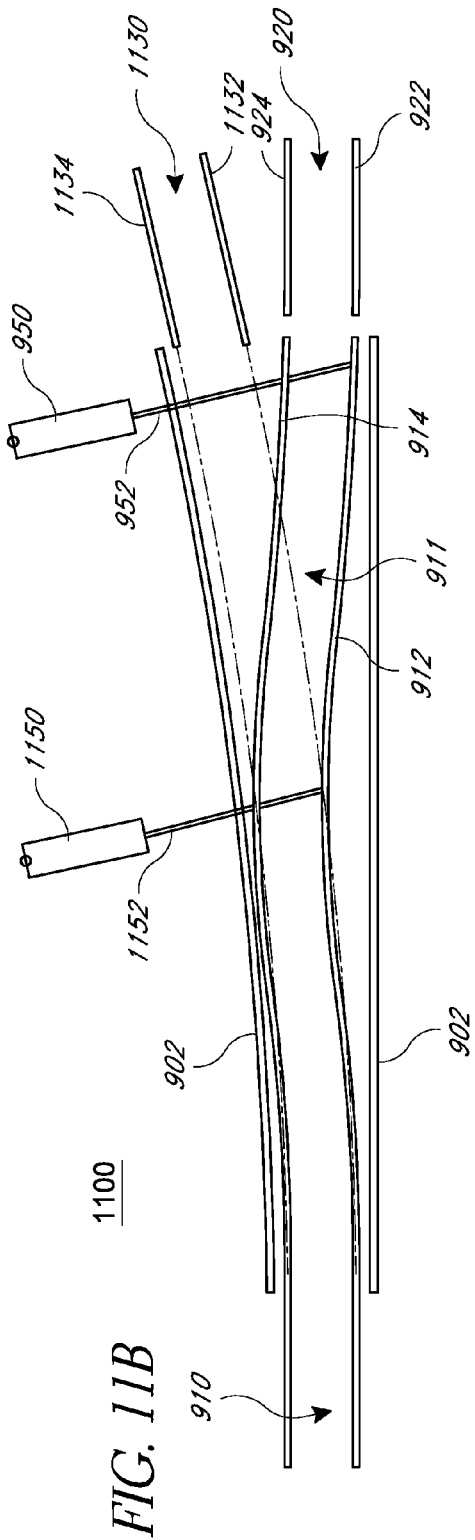

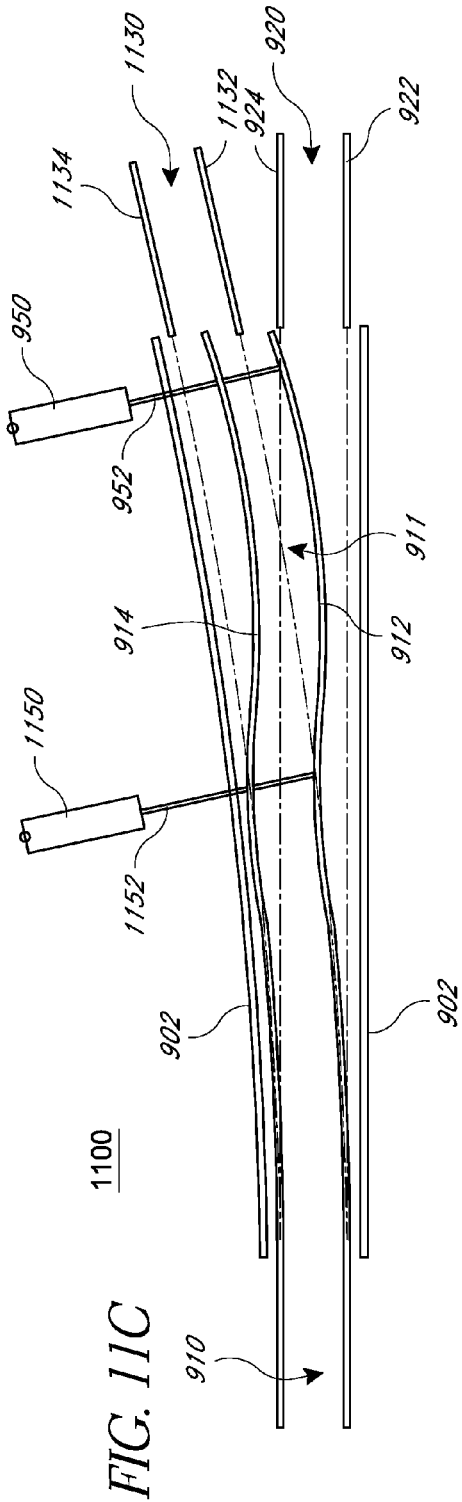
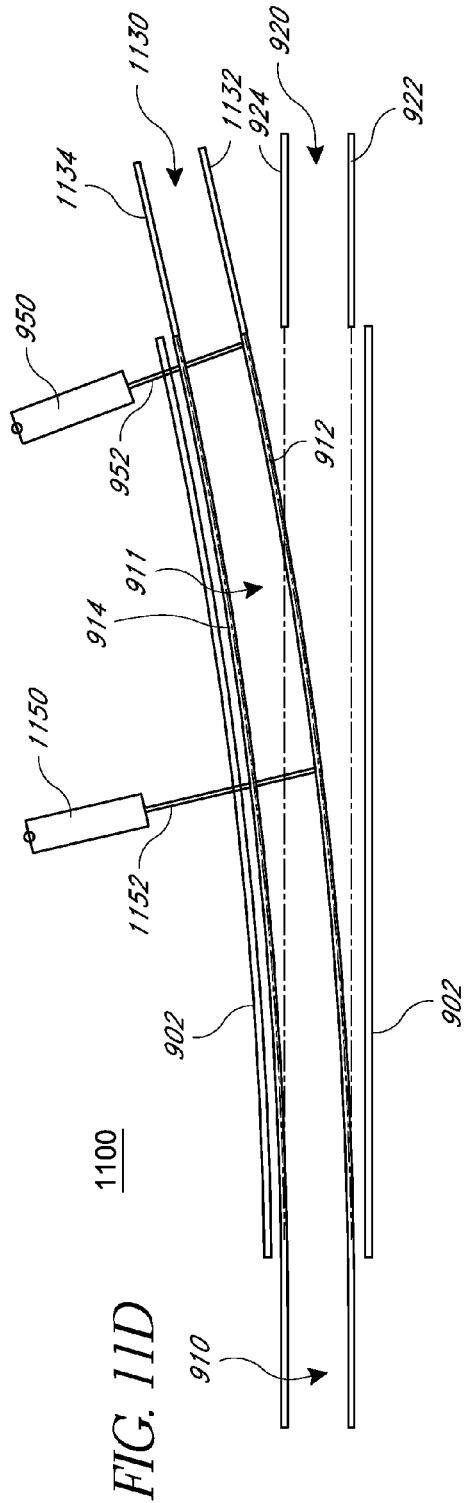

METHOD AND SYSTEM FOR TRANSPORTATION USING A RAIL STRUCTURE

CROSS-REFERENCE TO RELATED APPLICATIONS

This application is related to U.S. patent application Ser. No. 12/732,098, filed on Mar. 25, 2010, U.S. patent application Ser. No. 12/960,336, filed on Dec. 3, 2010, and U.S. Pat. No. 7,963,228, which issued on Jun. 21, 2011, all of which are hereby incorporated by reference in their entireties.

BACKGROUND

Field

The disclosure generally relates to a method and system for transportation using a rail structure. More particularly, the disclosure relates to a rail structure for use with a magnetic bearing structure and/or a vehicle including one or more wheels.

SUMMARY

In one aspect, a track for use with at least one of a magnetic levitation vehicle and a rolling vehicle having one or more wheels is disclosed. The track comprises a first head having a first lateral dimension, a second head having a second lateral dimension, a first connection extending between the first head and the second head, a first base, and a first support extending between the second head and the first base. The first connection portion provides a path for a first source of magnetic flux through the first head and the second head. The first connection portion has a third lateral dimension that is less than the first lateral dimension of the first head.

In another aspect, a source of magnetic flux for use with a rail structure is disclosed. The rail structure includes a first head having a first lateral dimension, a second head having a second lateral dimension, and a connection portion extending between the first head and the second head. The connection portion has a third lateral dimension that is less than the first lateral dimension of the first head and the second lateral dimension of the second head. The source of magnetic flux includes a first upper portion having a first polarity and a second upper portion having the first polarity. The first upper portion and the second upper portion are spaced apart to receive at least a portion of the first head therebetween. The first upper portion is magnetically attracted to the first head by a force that is greater than a magnetic attraction force between the first upper portion and the connection portion. The source of magnetic flux also includes a first lower portion having a second polarity opposite of the first polarity and a second lower portion having the second polarity. The first lower portion and the second lower portion are spaced apart to receive at least a portion of the second head therebetween. The first lower portion is magnetically attracted to the second head by a force that is greater than a magnetic attraction force between the first lower portion and the connection portion.

In another aspect, a track comprises a first track segment including a switch portion, a first actuator, and a second actuator. The first actuator is coupled to the switch portion and configured to move the switch portion between at least a first position and a second position. The second actuator is coupled to the switch portion and configured to move the switch portion between at least the first position and the second position. The first track segment and a second track segment form a first rail structure path when the switch portion is in the first position. The first track segment and a third track segment form a second rail structure path when the switch portion is in the second position.

BRIEF DESCRIPTION OF THE DRAWINGS

FIG. 9A is a plan view of a system including a track switch in a first position interconnecting a first track segment and a second track segment.

FIG. 9B is a plan view of the system of FIG. 9A showing the track switch in a second position interconnecting the first track segment and a third track segment.

FIG. 11A is a plan view of a system including a track switch in a first position interconnecting a first track segment and a second track segment.

FIG. 11B is a plan view of the system of FIG. 11A showing the track switch bent from the position illustrated in FIG. 11A.

FIG. 11C is a plan view of the system of FIG. 11A showing the track switch further bent from the position illustrated in FIG. 11B.

FIG. 11D is a plan view of the system of FIG. 11A showing the track switch in a second position interconnecting the first track segment and a third track segment.

DETAILED DESCRIPTION

The following detailed description is directed to certain specific aspects of the disclosure. However, the disclosure may be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may be performed by one or more computer processors configured to execute instructions retrieved from a computer-readable storage medium. A computer-readable storage medium stores information, such as data or instructions, for some interval of time, such that the information may be read by a computer during that interval of time. Examples of computer-readable storage media are memory, such as random access memory (RAM), and storage, such as hard drives, optical discs, flash memory, floppy disks, magnetic tape, paper tape, and punch cards.

Figure 1:
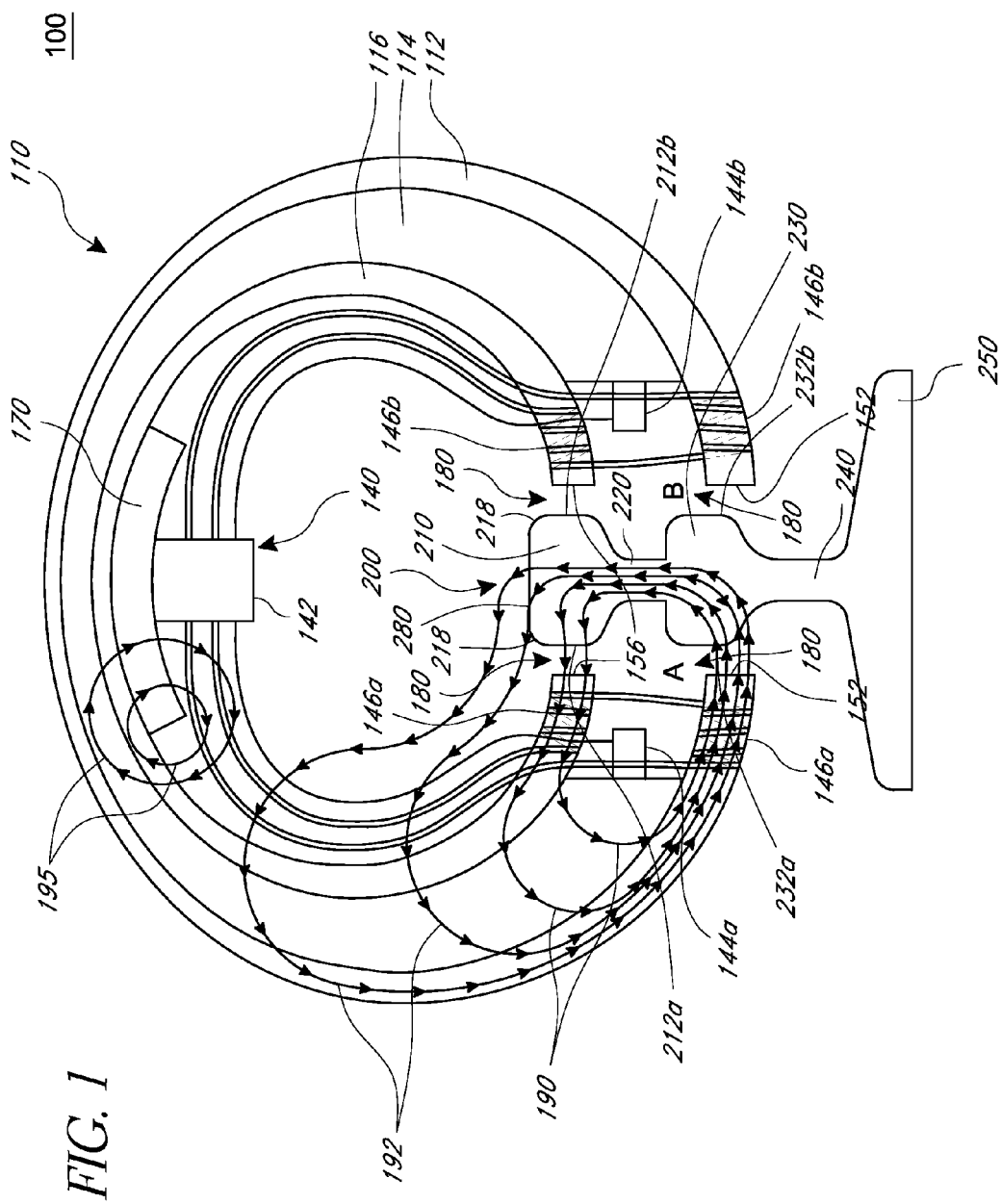
FIG. 1 is a cross-sectional view of an exemplary system including a magnetic bearing structure positioned proximally to a rail structure.

FIG. 1 is a cross-sectional view of a system 100 including a magnetic bearing structure 110 positioned proximally to a rail structure 200. The magnetic bearing structure 110 may be configured in accordance with any of the magnetic bearing structures disclosed in U.S. patent application Ser. No. 12/960,336 which is incorporated by reference in its entirety. For example, as illustrated in FIG. 1, the magnetic bearing structure 110 includes a source of magnetic flux 114 positioned between an inner shell 116 and an outer shell 112. Bother the inner shell 116 and the outer shell 112 may comprise a magnetizable material, such as iron or steel. In this way, the inner and outer shells 112 and 116 may guide magnetic flux generated by the source of magnetic flux 114 along the inner and outer surfaces of the magnetic bearing structure 110. For example, FIG. 1 illustrates a set of first magnetic flux paths 190 and a set of second magnetic flux paths 192. The first and second magnetic flux paths 190 and 192 travel through the source of magnetic flux 114, outer shell 112, rail structure 200, and inner shell 116.

The rail structure 200 illustrated in FIG. 1 includes a first head 210 and a second head 230. The first and second heads 210 and 230 are separated from one another by a connection portion 220. Additionally, the first and second heads 210 and 230 are spaced apart from, and supported above, a base 250 by a support web 240. The base may be disposed over a supporting surface, e.g., a ground surface, to support the rail structure 200 upright from the supporting surface. In this way, each head 210 and 230 is spaced apart vertically from the other head and from the base 250. The sizes and shapes of the first head 210, connection portion 220, second head 230, support web 240, and base 250 may vary from embodiment to embodiment. For example, as illustrated in FIG. 1, the first head 210 includes a flattened upper surface 280 and rounded upper shoulders 218 that connect the upper surface 280 with opposite lateral sides or faces 212a and 212b of the first head 210. As discussed in further detail below, the "double-headed" configuration of the rail structure 200 allows the rail structure to be compatible with magnetic levitation vehicles or systems as well as rolling vehicles or systems that include wheels for translating or moving along the rail structure 200 while directly contacting the upper surface 280.

The first head 210, the second head 230, and the connection portion 220 of the rail structure 200 are sized and shaped so as to fit between the gaps formed between the end regions 152 of the outer shell 112 and the end regions 156 of the inner shell 116. In some embodiments, the rail structure 200 may be sized and shaped to fit between the gaps between the end regions 152 and 156 without physically contacting any portion of the magnetic bearing structure 110. The rail structure 200 may have a longitudinal length to allow the magnetic bearing 110 to translate or move longitudinally (e.g., in and out of the page of FIG. 1) along the rail structure 200.

In some embodiments, the rail structure 200 comprises one or more magnetizable materials, for example, steel or iron. In some embodiments, the rail structure 200 comprises a magnetic material. The rail structure 200 may be fixed relative to an underlying surface, e.g., a ground surface. The magnetic bearing structure 110 may be attracted to the fixed rail structure 200 because any vertical movement of the magnetic bearing structure 110 relative to the rail is resisted by magnetic forces generated by the source of magnetic flux 114 which tend to minimize the length of the first and second magnetic flux paths 190 and 192. That is to say, the reluctance of the first and second magnetic flux paths 190 and 192 are minimized when the distance between the magnetic bearing structure 110 and the rail structure 200 is minimized. The components of the rail structure 200 may be integrally formed or separately formed and subsequently coupled together. For example, the first head, the connection portion, and the second head may be integrally formed from a common material.

Still referring to FIG. 1, when magnetic flux passes through air gaps 180 between the magnetic bearing structure 110 and the rail structure 200, there is a magnetic attraction between the magnetic bearing structure 110 and the rail structure 200. In this way, the magnetic bearing structure 110 may support a load without contacting the rail structure 200. Thus, the magnetic bearing structure 110 may be used to provide a levitative force that counters the force of gravity upon a vehicle. The levitative force may reduce frictional forces as the vehicle translates longitudinally along the rail structure 200. Thus, the system 100 may be used to transport a load via the magnetic bearing structure 110 using less energy than a rolling vehicle that utilizes one or more wheels that frictionally engage the rail structure 200.

In some embodiments, the source of magnetic flux 114 comprises a single permanent magnet. Permanent magnets may comprise rare earth magnets, samarium-cobalt magnets, alnico magnets, and neodymium magnets. The use of permanent magnets allows the magnetic bearing structure 110 to provide "always on" levitation forces which do not require an electric power source. In other embodiments, the source of magnetic flux 114 may comprise one or more permanent magnets and/or one or more electromagnets. In one embodiment, an electromagnet may be coupled to a power source configured to energize the electromagnet.

In one embodiment, the source of magnetic flux 114 is a bonded magnet. In one embodiment, a bonded magnet comprises a magnetic powder blended together with a thermoplastic resin to form injection molded, compression, or flexible magnets. The magnetic powder may be aligned in a preferred direction while the resin is liquid and may be maintained in this preferred direction by the resin when it is hardened. A bonded magnet may be used to minimize stray flux, e.g., flux projecting outside the desired boundaries of the magnetic bearing structure 110.

In another embodiment, the source of magnetic flux 114 comprises multiple magnets, either separated or adjoined. In one embodiment, each of the multiple magnets is arranged such that one polarity faces the outer shell 112 and the other polarity faces the inner shell 116. In one embodiment, a non-magnetizable substance, such as glass, wood, resin, or air, is placed between the magnets.

Although magnetic flux paths 190 and 192 are only illustrated on the left-hand side of FIG. 1, it is to be appreciated that the magnetic flux generated by the source of magnetic flux 114 may be symmetrical about the vertical axis (e.g., across the rail structure 200). Further, although only four magnetic flux paths 190 and 192 are illustrated in FIG. 1, it is to be appreciated that the magnetic flux generated by the source of magnetic flux 114 may be a continuous magnetic field and more or fewer magnetic flux paths 190 and 192 could be used to represent it.

The inner shell 116 comprises two end regions 156 located proximally to the opposite lateral faces 212a and 212b of the first head 210. The outer shell 112 also comprises two end regions 152 located proximally to opposite lateral faces 232a and 232b of the second head 230. In one embodiment, the source of magnetic flux 114 generates a magnetic field represented by the first magnetic flux paths 190 and the second magnetic flux paths 192. The first magnetic flux paths 190 and the second magnetic flux paths 192 begin and end at the source of magnetic flux 114. As illustrated, the outer shell 112 guides the magnetic flux paths 190 and 192 along the outer shell 112 to one of the end regions 152 where the flux paths 190 and 192 cross an air gap 180 between the outer shell 112 and the rail structure 200. The first magnetic flux paths 190 enter the second head 230 of the rail structure 200 and pass through the connection portion 220 to the first head 210. From the first head 210, the first magnetic flux paths 190 exit the rail structure 200 through the lateral faces 212a and 212b by crossing back over the air gap 180 and enter the inner shell 116. The inner shell 116 guides the first magnetic flux paths 190 along the inner shell 116 back to the source of magnetic flux 114. Depending on the polarity of the source of magnetic flux 114, this order may be reversed.

As mentioned above, when magnetic flux crosses the air gaps 180 between the magnetic bearing structure 110 and the rail structure 200, there is a magnetic attraction between the magnetic bearing structure 110 and the rail structure 200. The horizontal components of the first magnetic flux paths 190 relative to the rail structure 200 may add to approximately zero when the magnetic bearing structure 110 is centered with respect to the rail structure 200. The vertical components of the first magnetic flux paths 190 on both sides of the rail structure 200 may each contribute to a vertical force acting upon the magnetic bearing structure 110. Thus, the magnetic bearing structure 110 may be used to provide a levitative force that counters the force of gravity upon a load, such as a vehicle. The levitative force may reduce frictional forces acting the magnetic bearing structure 110 as the vehicle moves along the rail structure 200.

Depending on the configuration, it is possible that not all of the magnetic flux paths 190 and 192 cross the air gaps 180 from the rail structure 200 to the magnetic bearing structure 110. The first magnetic flux paths 190 may cross the air gaps 180 twice, by crossing the air gaps 180 a first time when flowing from the magnetic bearing structure 110 to the rail structure 200 and crossing the air gaps 180 a second time when crossing the from rail structure 200 to the magnetic bearing structure 110. The second magnetic flux paths 192 may not cross the air gaps 180 twice. The second magnetic flux paths 192 may begin at a portion of the source of magnetic flux 114 that is farther from the air gaps 180 than the portions where the first magnetic flux paths 190 originate from. The second magnetic flux paths 192, like the first magnetic flux paths 190, may be guided by the outer shell 112 to one of the end regions 152 of the outer shell 112, cross the air gap 180 between the outer shell 112 and the rail, and continue through the rail structure 200. However, upon exiting the rail structure, the second magnetic flux paths 192 may not cross the air gaps 180 to one of the end regions 156 of the inner shell 116, but rather, may "short circuit" to a portion of the inner shell 116 further from the end regions 156.

The second magnetic flux paths 192 may not be as desirable as the first magnetic flux paths 190 because a second magnetic flux path 192 may not twice cross the air gap 180. Accordingly, such a magnetic flux path 192 may produce less levitative force than a first magnetic flux path 190 that crosses the air gap 180 twice. The second magnetic flux paths 192 may not be as desirable as the first magnetic flux paths 190 because the vertical components of the portion of the second magnetic flux paths 192 from the rail structure 200 to the inner shell 116 may generate a downward force, reducing the amount of upward (e.g., vertical) levitative force produced by the magnetic bearing structure 110.

To increase the levitative forces provided by the first magnetic flux paths 190 as compared to the levitative forces provided by the second magnetic flux paths 192, the first and second heads 210 and 230 of the rail structure 200 may be sized and shaped so as to decrease the sizes of the air gaps 180 between the end regions 152 and 156 and the rail structure 200. That is to say, the first and second heads 210 and 230 of the rail structure 200 may be sized and shaped such that a horizontal or lateral distance between the first head 210 and the end regions 156 is less than a horizontal distance between the connection portion 220 and the magnetic bearing structure 110. Similarly, a horizontal distance between the second head 230 and the end regions 152 may be less than the horizontal distance between the connection portion 220 and the magnetic bearing structure. In this way, the first magnetic flux paths 190 that cross the air gap 180 twice (e.g., between the end region 152 and the second head 230 and between the first head 210 and the end region 156) may provide a greater magnetic levitative force across the gap 180 because the length of the path through the gap 180 is decreased as compared to a rail structure that does not include a double-headed configuration.

Additionally, the double-headed configuration of the rail structure 200 may also act to vertically align or otherwise position the magnetic bearing structure 110 relative to the rail structure 200. For example, because the levitative forces of the first flux paths 190 that cross the air gaps 180 twice are greater than the levitative forces of the second flux paths 192, the difference in forces may bias or otherwise urge the magnetic bearing structure 110 to be vertically aligned with the rail structure 200 such that the first head 210 is laterally aligned (e.g., horizontally aligned) with at least a portion of the end regions 156 and such that the second head 230 is laterally aligned with at least a portion of the end regions 152. In some embodiments, the connection portion 220 may be recessed relative to the first head 210 and/or second head 230 such that an outer surface of the connection portion 220 is offset or spaced further from the magnetic bearing structure 110 than the first and second heads 210 and 230. In this way, the forces of the magnetic flux passing through the flux paths 190 and 192 will attract or otherwise position the magnetic bearing structure 110 relative to the rail structure 200 such that the end regions 152 and 156 are disposed adjacent to at least a portion of one of the first and second heads 210 and 230. Accordingly, a vertical riding alignment of the magnetic bearing structure 110 relative to the rail structure 200 may be guided, at least in part, by the spatial configuration of the first and second heads 210 and 230 of the rail structure 200.

In one embodiment, the magnetic bearing structure 110 includes a focusing source of magnetic flux 170 which provides a set of third magnetic flux paths 195. The focusing source of magnetic flux 170 may be positioned between the inner shell 116 and the rail structure 200. The focusing source of magnetic flux 170 may alter the first and second magnetic flux paths 190 and 192 that begin at the source of magnetic flux 114. For example, the focusing source of magnetic flux 170 may increase the number of first magnetic flux paths 190 and reduce the number of second magnetic flux paths 192. Conceptually, the third magnetic flux paths 195 may repel at least the second magnetic flux paths 192. As described above, the second magnetic flux path 192 may not be as desirable as the first magnetic flux paths 190 because a second magnetic flux paths 192 may not twice cross the air gap 180 and may produce less levitative force than a first magnetic flux path 190 that crosses the air gap 180 twice. Thus, the focusing source of magnetic flux 170 may increase the net levitative force generated by the magnetic bearing structure 110.

In some embodiments, the rail structure 200 may be provided as part of an existing track and the magnetic bearing structure 110 may be constructed or otherwise formed for use with the provided rail structure. In such embodiments, the end regions 156 of the inner shell 116 may be sized and shaped so as to accommodate the first head 210 of the rail structure 200 therebetween. For example, the end regions 156 may be spaced apart from one another such that the maximum lateral dimension of the first head 210 may fit between the end regions 156. Additionally, the end regions 156 may have surfaces or faces that may be laterally aligned with the lateral faces 212a and 212b of the first head 210 to promote magnetic attraction between the end regions 156 and the first head 210. Similarly, the end regions 152 of the outer shell may be sized and shaped so as to accommodate the second head 230 of the rail structure 200 therebetween in order to promote magnetic attraction between the end regions 152 and the second head 210. In this way, the magnetic bearing structure 110 may be sized and shaped, or otherwise configured, to accommodate any given rail structure 200 having at least two heads.

In one embodiment, the magnetic bearing structure 110 includes a control system 140 for maintaining the horizontal position of the magnetic bearing structure 110 relative to the rail structure 200. The control system 140 may comprise a controller 142, one or more sensors 144a and 144b, and one or more coils 146a and 146b. In one embodiment, the controller 142 is attached to the focusing source of magnetic flux 170.

The control system 140 may control the magnitude and direction of the current through the coils 146a and 146b to horizontally center the magnetic bearing structure 110 with respect to the rail structure 200. In one embodiment, the control system 140 preserves the air gaps 180 between the source of magnetic flux 114 and the rail structure 200 at a substantially constant size by balancing attractive horizontal forces between the source of magnetic flux 114 and the rail structure 200.

One or more sensors 144a and 144b may be used to determine the horizontal position of the magnetic bearing structure 110 and to provide this information to the controller 142. The sensors 144a and 144b may generate sensor data indicative of a distance from at least one of the sensors 144a and 144b to the rail structure 200, another object, or to a predefined reference point.

Each coil 146a and 146b may carry an electric current that, in turn, generates a magnetic flux within the coil 146a and 146b. Accordingly, each coil 146a and 146b may operate as an electromagnet that generates a magnetic flux in response to an electric current provided by the controller 142. The generated magnetic flux may bias the magnetic flux generated by the source of magnetic flux 114 and may provide a net horizontal force to the magnetic bearing structure 110 through differential flux control. In particular, the amount of magnetic flux crossing the air gaps 180 on either side of the rail structure 200 may be differentially modulated by adding the bias magnetic flux generated by the coil 146a and 146b to the magnetic flux generated by the source of magnetic flux 114.

Placement of the coils 146a and 146b proximal to the rail may be particularly advantageous as the magnetic flux generated by the coils 146a and 146b is more likely to cross the air gaps 180 to the rail structure 200. Placement of the coils 146a and 146b proximal to the rail may reduce the amount of power needed to control the horizontal position of the magnetic bearing structure 110. Thus, disposing the coils 146a and 146b adjacent to the first and second heads 210 and 230 of the rail structure 200 may act to decrease power consumption and increase efficacy of the control system 140.

Figure 2:
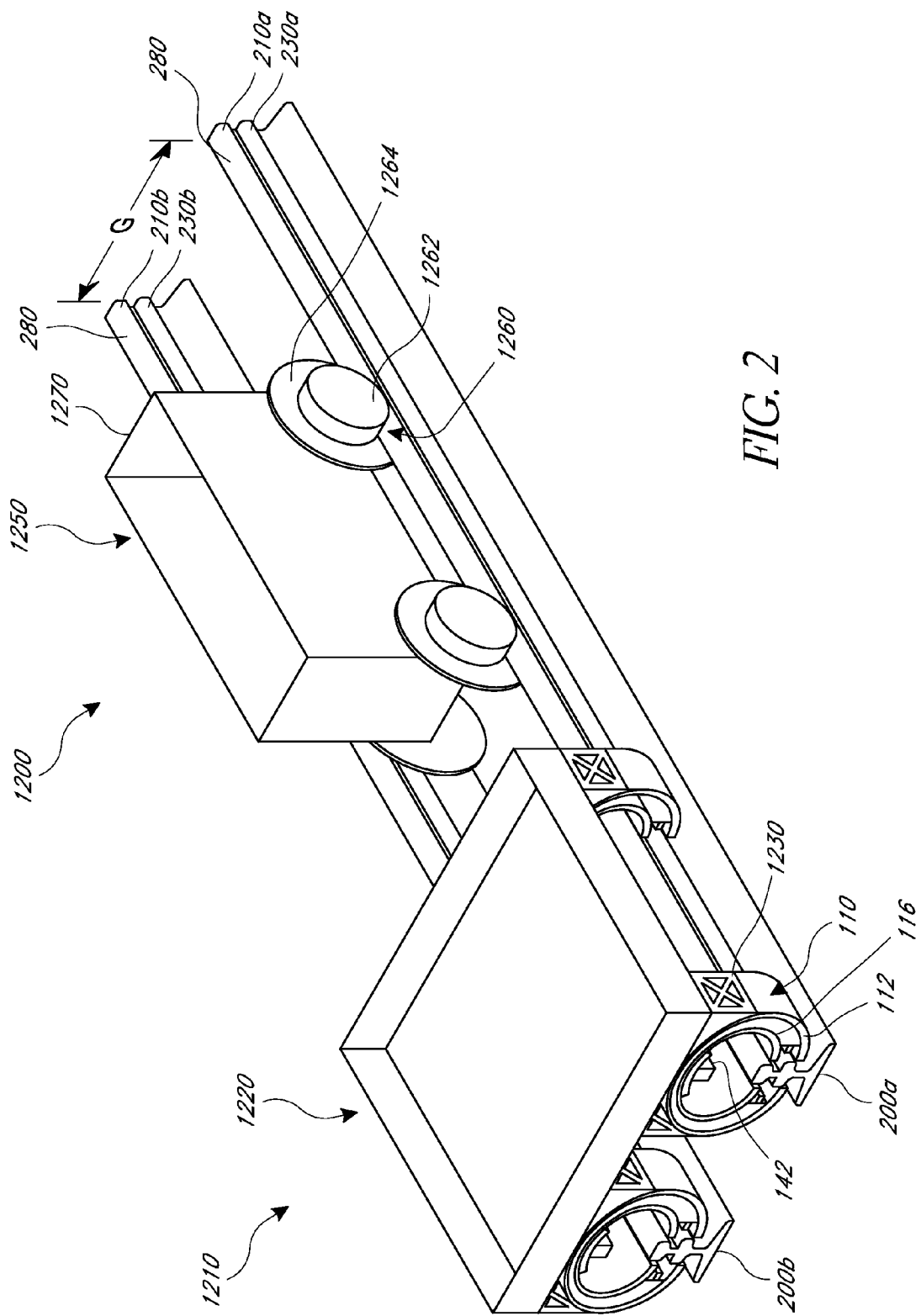
FIG. 2 is a perspective view of a system including a first vehicle having a load supported by a plurality of magnetic bearing structures and a second vehicle having a load supported by flanged wheels, both vehicles positioned proximally to a pair of rail structures forming a track.

In some embodiments, a system may include more than one rail structure 200 and the respective first heads 210 of the rail structures may be separated by a rail gauge or a track gauge distance. For example, FIG. 2 is a perspective view of a system 1200 including a first rail structure 200a and a second rail structure 200b. The first and second rail structures 200a and 200b are separated by a gauge distance G measured between the inner sides of the first heads 210a and 210b of the rail structures. In some embodiments, the rail structures 200a and 200b may be separated by a standard gauge of 1,435 mm. In other embodiments, the gauge distance G may be greater or less than the standard gauge distance, for example, 1,000 mm, 1,067 mm, 1,524 mm, or 1,672 mm. In this way, the first and second rail structures 200a and 200b form at least a portion of a track.

As shown in FIG. 2, the system 1200 may include a first vehicle 1210 and a second vehicle 1250 positioned relative to the rail structures 200a and 200b so as to translate along a longitudinal length of the rail structures. The first vehicle 1210 may include a load 1220 that is supported above the rail structures 200a and 200b by a plurality of magnetic bearing structures 110 configured in accordance with the magnetic bearing structure 110 of FIG. 1. In this way, the first vehicle 1210 may be considered a magnetic levitation vehicle. The load 1220 may be coupled to the magnetic bearing structures 110 by one or more support structures 1230. The support structures 1230 may be securely coupled to the load 1220 and/or magnetic bearing structures 110 by welding, mechanical fasteners, or other suitable affixing techniques.

Each of the magnetic bearing structures 110 is configured to suspend or levitate relative to one of the rail structures 200a and 200b such that the end regions of the inner shells 116 are disposed horizontally adjacent to at least a portion of one of the first heads 210a and 210b and such that the end regions of the outer shells 112 are disposed horizontally adjacent to at least a portion of one of the second heads 230a and 230b. In this way, the first vehicle 1210 may translate or move longitudinally along the rail structures 200a and 200b without frictionally engaging either of the rail structures. In some embodiments, one or more of the magnetic bearing structures 110 may include a control system to control the horizontal position, vertical position, pitch, yaw, and roll of the first vehicle 1210 relative to the rail structures 200a and 200b. In some embodiments, the first vehicle 1210 may comprise one or more engines for providing a propulsive force in the direction of the rail structures 200a and 200b. For example, the first vehicle 1210 may include a locomotive engine and/or a linear motor as described in U.S. Pat. No. 7,617,779, which is incorporated by reference in its entirety.

The utilization of two or more rail structures 200 as illustrated in FIG. 2 instead of a single rail structure may advantageously inhibit rotation of the magnetic bearing structures 110 with respect to their respective rail structure 200a and 200b. As a result, the use of two or more magnetic bearing structures 110 on two separate rail structures 200a and 200b rather than a single rail structure may advantageously inhibit undesirable rotation of the first vehicle 1210. In other embodiments, a vehicle may include one or more magnetic bearing structures 110 and a single rail structure 200. In such an embodiment, rotation of the vehicle relative to the rail may be optionally inhibited by other means. For example, a vehicle may include one or more wheels which physically contact the ground or another surface on a lateral side of the rail to oppose rotation of the vehicle relative to the rail structure.

Decoupling the first vehicle 1210 from the rail structures 200a and 200b may be performed by the control systems 142 of each of the magnetic bearing structures 110. For example, the control system 142 may provide a signal to an electromagnet, e.g., a coil, to position or move the magnetic bearing structure 110 relative to the rail structure 200a or 200b. The first vehicle 1210 may also be decoupled from the rail structures 200a and 200b via a mechanical lift-off system.

With continued reference to FIG. 2, the second vehicle 1250 includes a load 1270 that is supported by a plurality of flanged wheels 1260. In this way, the second vehicle 1250 may be considered a rolling vehicle. In some embodiments, each of the flanged wheels 1260 includes a wheel 1262 configured to roll across an upper surface or profile 280 of one of the rail structures 200a or 200b and a flange 1264 for aligning the wheel 1262 relative to the rail structures. Although depicted as flanged wheels 1260, one of skill in the art will appreciate that other types of conventional wheels may be utilized to support the load 1250 relative to the rail structures 200a and 200b while contacting at least a portion of the rail structures. In some embodiments, the upper surface 280 of each of the rail structures 200a and 200b may be contoured and/or sized so as to provide a rolling or sliding surface for one or more wheels. For example, the upper surface 280 may be flat. In this way, the rail structures 200a and 200b are configured to allow wheels to directly roll along a portion of each of the rail structures while also providing for the use of magnetic levitation vehicles or systems that incorporate one or more magnetic bearing structures. That is to say, the rail structures 200a and 200b may be compatible with conventional vehicles, e.g., standard train cars, and magnetic levitation vehicles. In some embodiments, the upper surfaces 280 of the rail structures 200a and 200b can have a width of between 60 mm and 80 mm. For example, the upper surfaces 280 of the rail structures 200a and 200b can have a width of about 72.2 mm. In some embodiments, the second vehicle 1250 and the first vehicle 1210 may be coupled together.

Figure 3:
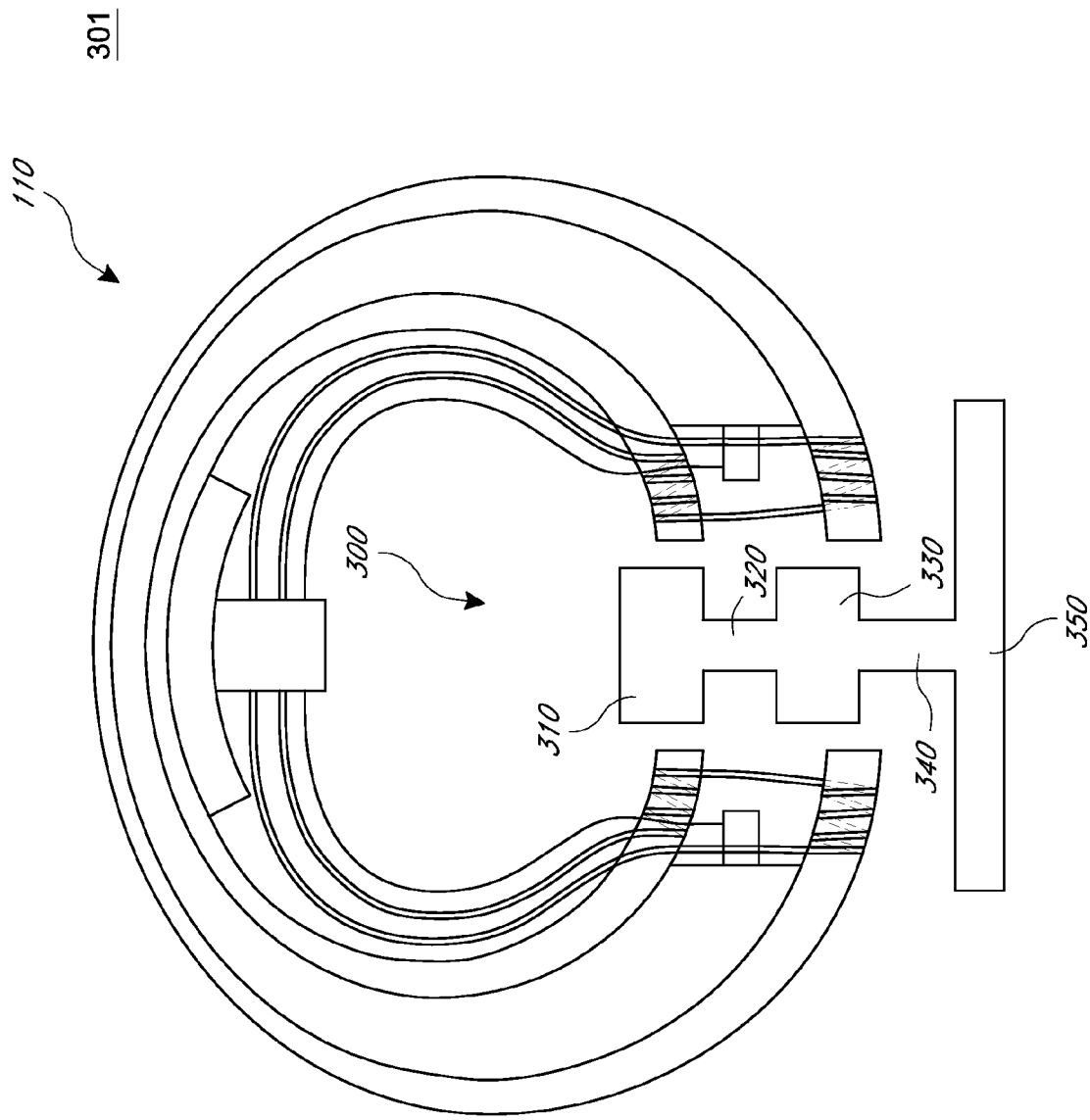
FIG. 3 is a cross-sectional view of a system including the magnetic bearing structure of FIG. 1 positioned proximally to another rail structure having a polygonal cross-sectional shape.

Although FIGS. 1 and 2 illustrate examples of rail structures 200 with a particular cross-sectional shape and profile, other embodiments of double-headed rail structures are envisioned as described below. FIG. 3 is a cross-sectional view of a system 301 comprising the magnetic bearing structure 110 and another rail structure 300. The rail structure 300 includes a first head 310 and a second head 330 that are coupled to one another via a connection portion 320. In this way, the rail structure 300 provides a magnetic flux path through the second head 330 to the first head 310 via the connection portion 320. The first head 310 and the second head 330 are spaced from a base 350 by a web support 340. In contrast to the rail structure 200 illustrated in FIG. 1, the rail structure 300 has a strictly polygonal cross-sectional shape. That is to say, the rail structure 300 does not include any rounded or curved contours or segments. In this way, the first head 310, the connection portion 320, the second head 330, the web support 340, and the base each have rectangular cross-sectional shapes. As a result, the rail structure 300 contains only flat outer surfaces and manufacturing of the rail structure 300 may be simplified as compared to a rail structure having one or more curved surfaces or contours. As with the rail structure 200 described above, the first and second heads 310 and 330 each have maximum lateral dimensions that are greater than the maximum lateral dimensions of the connection portion 320 and the web support 340. Thus, the first and second heads 310 and 330 may be disposed nearer to the magnetic bearing structure 110 than the other portions of the rail structure 300.

Figure 4:
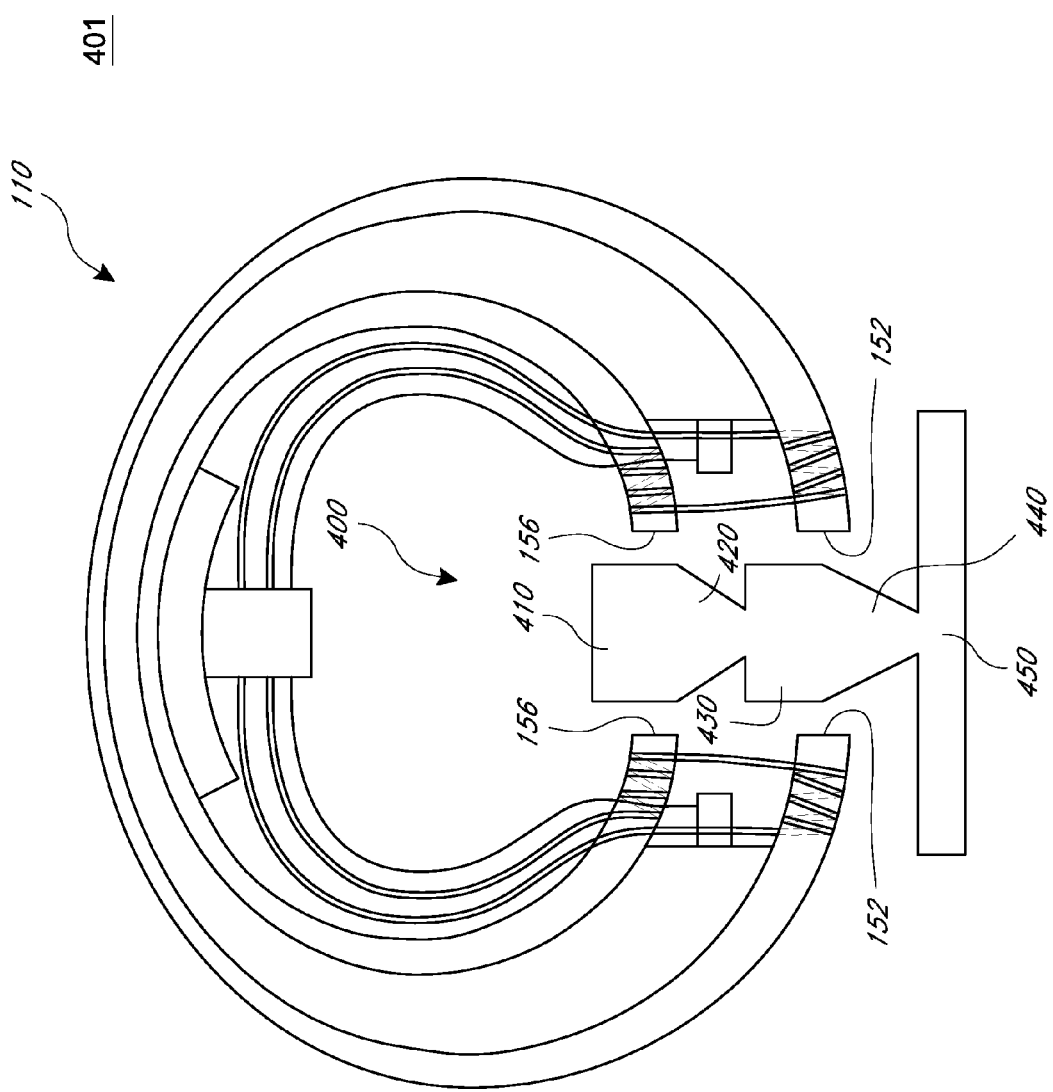
FIG. 4 is a cross-sectional view of a system including the magnetic bearing structure of FIG. 1 positioned proximally to another rail structure having a tapered connection portion and a tapered support web.

FIG. 4 is a cross-sectional view of a system 401 comprising the magnetic bearing structure 110 and another rail structure 400. The rail structure 400 includes a first head 410 and a second head 430 that are coupled to one another via a connection portion 420. The first head 410 and the second head 430 are spaced from a base 450 by a web support 440. The first head 410, the second head 430, and the base 450 each have a rectangular cross-sectional shape. However, in contrast to the rail structures 200 and 300 illustrated in FIGS. 1 and 3, the connection portion 420 is tapered from the first head 410 to the second head 430 such that the horizontal width of the connection portion 420 narrows from the first head 410 to the second head 430 in a constant fashion. Additionally, the web support 440 tapers from the second head 430 to the base 450 such that the horizontal width of the web support 440 narrows from the second head 430 to the base 450 in a constant fashion. The tapered cross-sectional shapes of the connection portion 420 and web support 440 may reduce the sizes of the gaps between end regions 152 and 156 of the magnetic bearing structure 110 and connection portion 420 and web support 440. This reduction in gap size may improve the magnetic attraction between the magnetic bearing structure 110 and the rail structure 400 and may accommodate different magnetic bearing structures having differently dimensioned end regions. For example, the rail structure 400 may accommodate a magnetic bearing structure having upper end regions that are disposed further apart from lower end regions than magnetic bearing structure 110.

Figure 5:
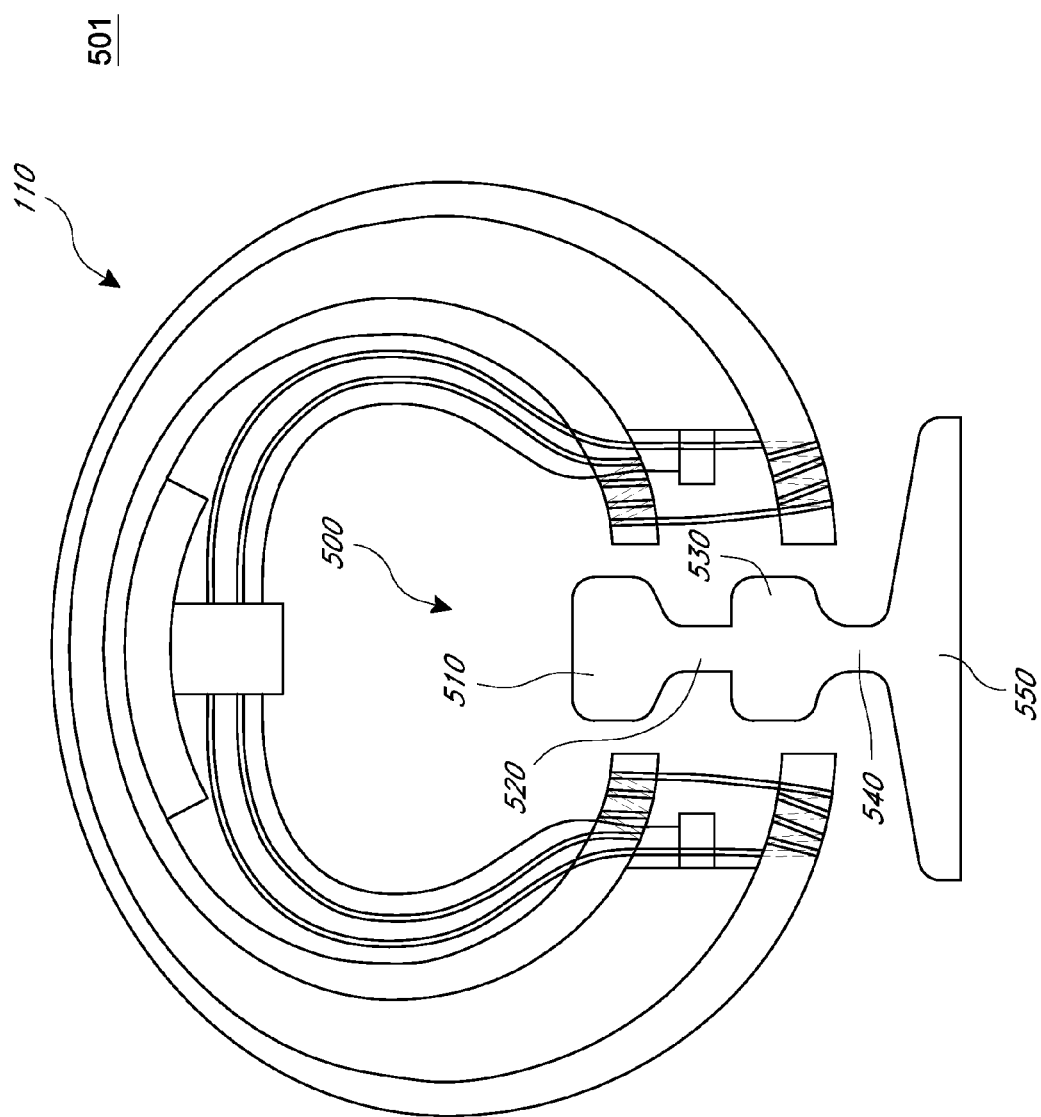
FIG. 5 is a cross-sectional view of a system including the magnetic bearing structure of FIG. 1 positioned proximally another rail structure having a support web having a vertical profile that is less than a vertical profile of the support web of the rail structure of FIG. 1.

FIG. 5 is a cross-sectional view of a system 501 comprising the magnetic bearing structure 110 and another rail structure 500. The rail structure 500 includes a first head 510 and a second head 530 that are coupled to one another via a connection portion 520. The first head 510 and the second head 530 are spaced from a base 550 by a web support 540. The first head 510 has a flat upper surface, curved upper shoulders, and flat lateral faces or surfaces. Additionally, the first head 510 includes curved lower shoulders that connect the first head 510 with the connection portion 520. The connection portion 520 has a maximum lateral dimension that is less than the maximum lateral dimensions of the first head 510 and second head 520. Similar to the first head 510, the second head 530 includes curved upper shoulders and curved lower shoulders disposed on opposite sides of flat lateral surfaces of faces.

As shown in FIG. 5, the first head 510, connection portion 520, second head 530, and base 550 are similarly sized and shaped as compared to the first head 210, connection portion 220, second head 230, and base 250 of the rail structure 200 of FIG. 1. However, the web support 540 has a vertical profile that is less than the vertical profile of the web support 240 of the rail structure 200. That is to say, the maximum vertical dimension of the web support 540 is less than the maximum vertical dimension of the web support 240. As a result, the overall maximum vertical dimension of the rail structure 500 is less than the overall maximum vertical dimension of the rail structure 200. The embodiment of the rail structure 500 illustrated in FIG. 5 may be particularly advantageous for use with vehicles having wheels that roll or slide upon a portion of the rail structure 500 because the centers of masses of such vehicles may be disposed closer to the ground surface than the rail structure 200 of FIG. 1, which may allow for a more stable ride of such vehicles. Further, because the web support 540 is shorter, less material may be needed for manufacturing thereby reducing manufacturing costs.

Figure 6:
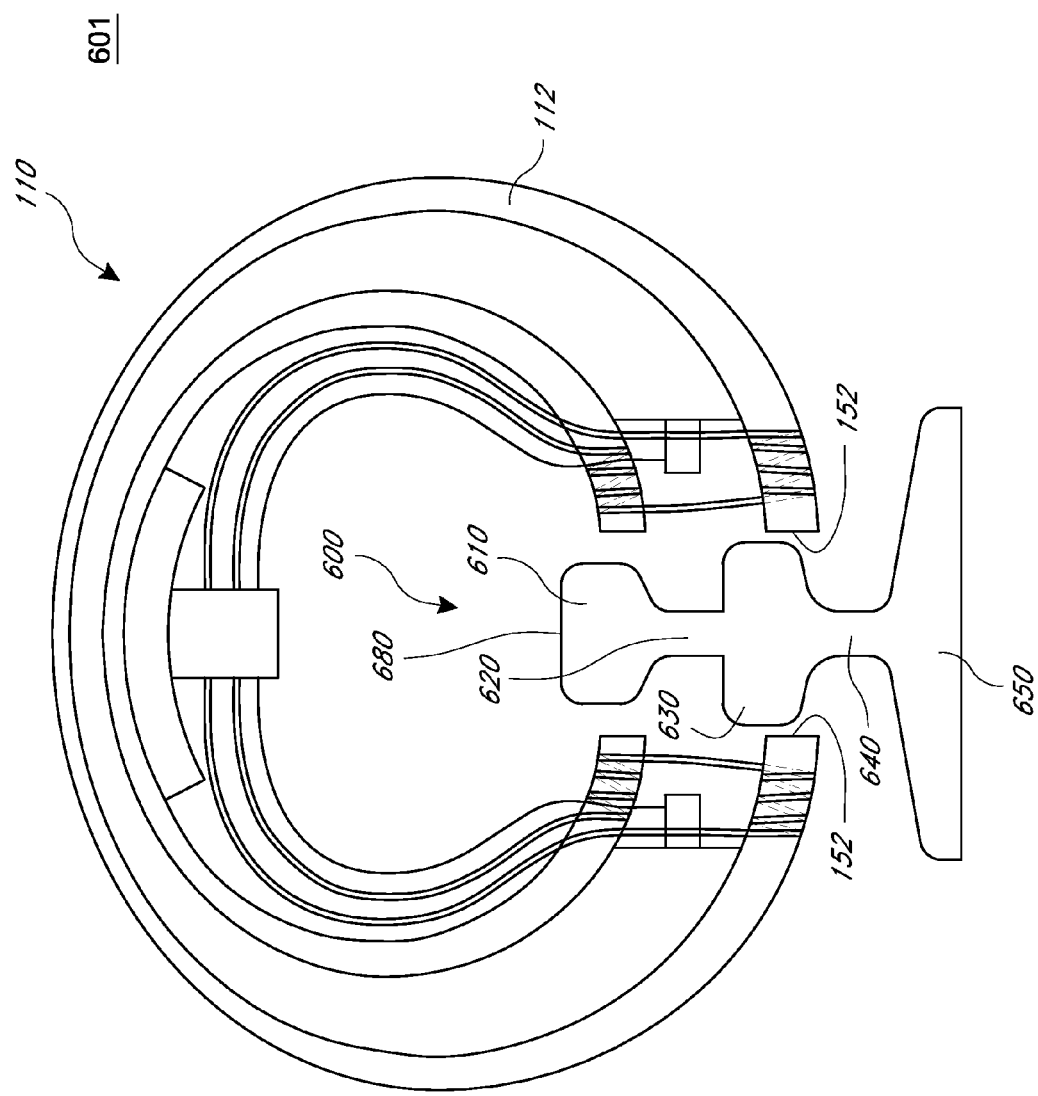
FIG. 6 is a cross-sectional view of a system including the magnetic bearing structure of FIG. 1 positioned proximally another rail structure having a first head that is differently sized than a second head of the rail structure.

FIG. 6 is a cross-sectional view of a system 601 comprising the magnetic bearing structure 110 and an embodiment of a rail structure 600. The rail structure 600 includes a first head 610 and a second head 630 that are coupled to one another via a connection portion 620. The first head 610 and the second head 630 are spaced from a base 650 by a web support 640. In contrast to the rail structures 200, 300, 400, and 500 of FIGS. 1-5, the first head 610 of the rail structure 600 is differently sized and shaped than the second head 630. As illustrated, the second head 630 has a greater horizontal dimension than the first head 610. As a result, the second head 630 is more elongated in the horizontal or lateral direction than the first head 610.

The embodiment illustrated in FIG. 6 may be advantageous for use with magnetic levitation vehicles and also for use with rolling vehicles that directly contact the upper surface 680 of the rail structure 600. For example, the first head 610 of the rail structure 600 may be sized and shaped so as to provide a suitable contact surface for one or more wheels while the second head 630 may be sized and shaped to increase magnetic levitation forces between a magnetic bearing and the rail structure 600. That is to say, because the second head 630 need not contact a wheel, the head 630 may be shaped so as to decrease a gap or space between the second head 630 and a magnetic bearing structure thereby increasing the magnetic forces therebetween. As a result, the rail structure 600 may be used with magnetic levitation vehicles and conventional track vehicles without requiring a retrofit of the conventional vehicles.

Figure 7:
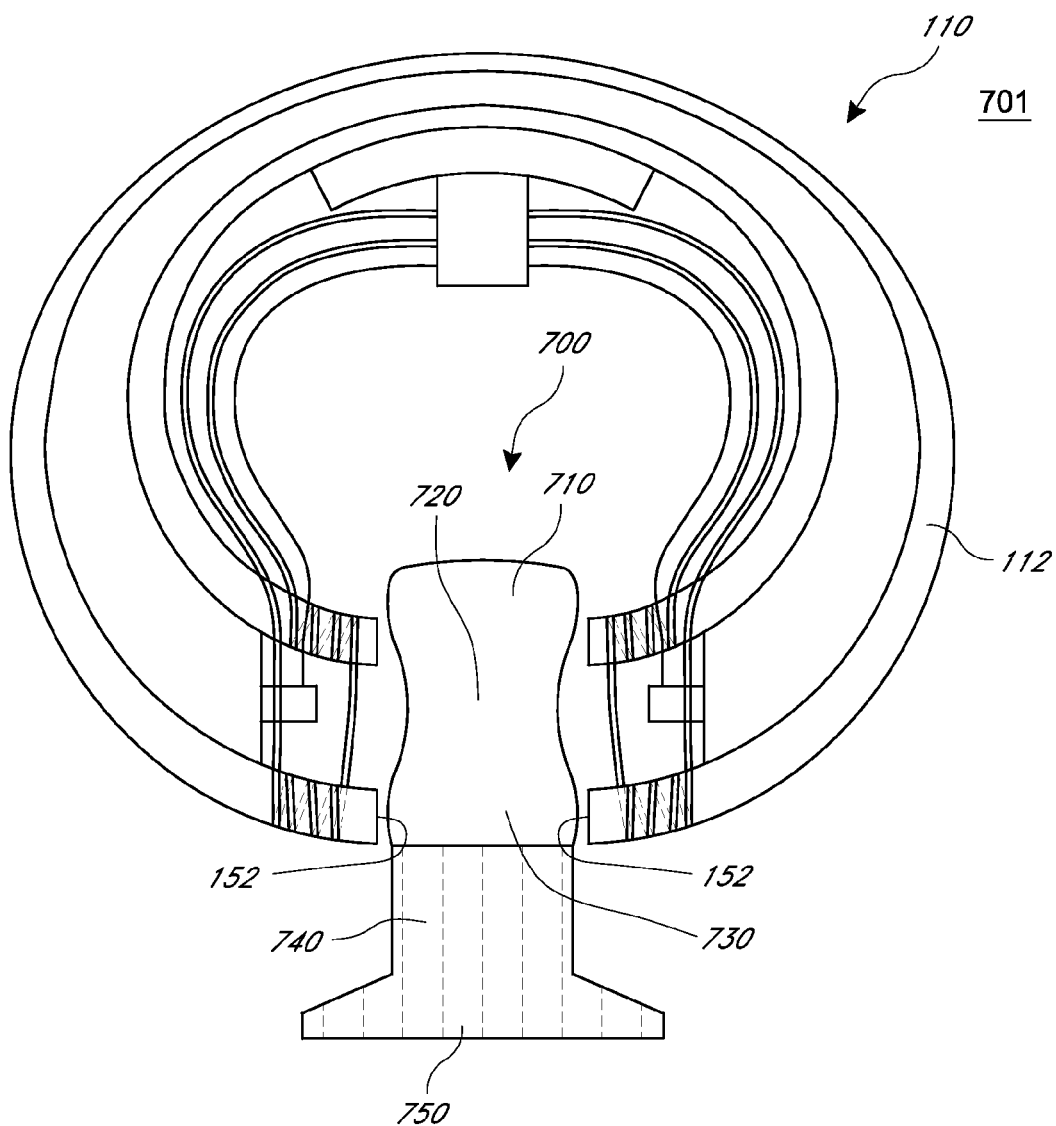
FIG. 7 is a cross-sectional view of a system including the magnetic bearing structure of FIG. 1 positioned proximally another rail structure having conductive first and second heads supported above a non-conductive support web and a non-conductive base.

FIG. 7 is a cross-sectional view of a system 701 comprising the magnetic bearing structure 110 and an embodiment of a rail structure 700. The rail structure 700 includes a first head 710 and a second head 730 that are coupled to one another via a connection portion 720. The first head 710 and the second head 730 are spaced from a base 750 by a web support 740. As illustrated, the first head 710, the second head 730, and the connection portion 720 can be integrally formed. Likewise, the base 750 and the web support 740 can be integrally formed and coupled to the second head 730. As discussed above, the first head 710, the second head 730, and the connection portion 720 can be formed from one or more conductive materials, for example, steel. In some embodiments, the web support 740 and the base 750 can be formed from one or more non-conductive materials, for example, concrete or cement. The non-conductive material(s) of the web support 740 and the base 750 may inhibit or reduce eddy current losses through this structure. Further, as a result of the non-conductive web support 740 and base 750, the vertical component of magnetic flux paths passing from the magnetic bearing structure 110 through the second head 730 of the rail structure 700 may be greater than embodiments where the web support and base are conductive.

Figure 8A:
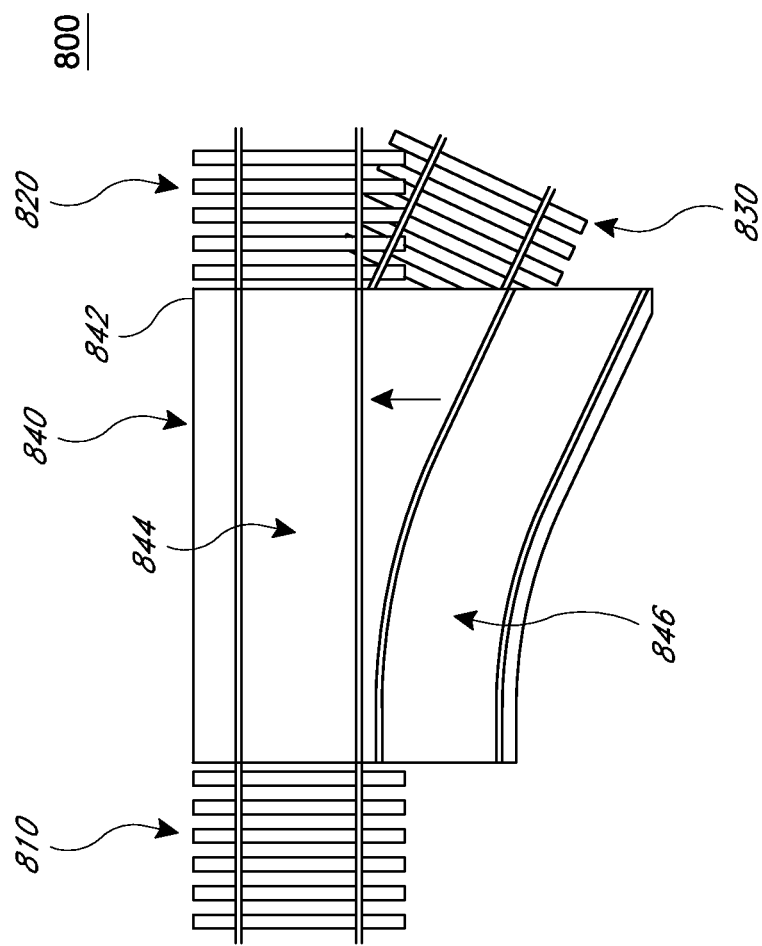
FIG. 8A is a plan view of a system including a track switch in a first position interconnecting a first track segment and a second track segment.

FIG. 8A is a plan view of a portion of a track 800 including a first track segment 810, a second track segment 820, and a third track segment 830. Each of the first track segment 810, the second track segment 820, and the third track segment 830 may include one or more rail structures (e.g., the rail structures described above with reference to FIGS. 1-7) for use with magnetic levitation vehicles and/or rolling vehicles. The track 800 also includes a switch 840 positioned between the first track segment 810 and the second and third track segments 820 and 830. The switch 840 includes a first set of rail structures 844 and a second set of rail structures 846 disposed on a platform 842. In the configuration illustrated in FIG. 8A, the switch 840 is depicted in a first position wherein the second track segment 820 is connected to the first track segment 810 by the first set of rail structures 844. In this first position, the rail structures of the third track segment 830 are not connected to the rail structures of the first track segment 810 by any rail structures of the switch 840. That is to say, in the first position, the switch provides a path between the first track segment 810 and the second track segment 820 without connecting the first track segment 810 with the third track segment.

Figure 8B:
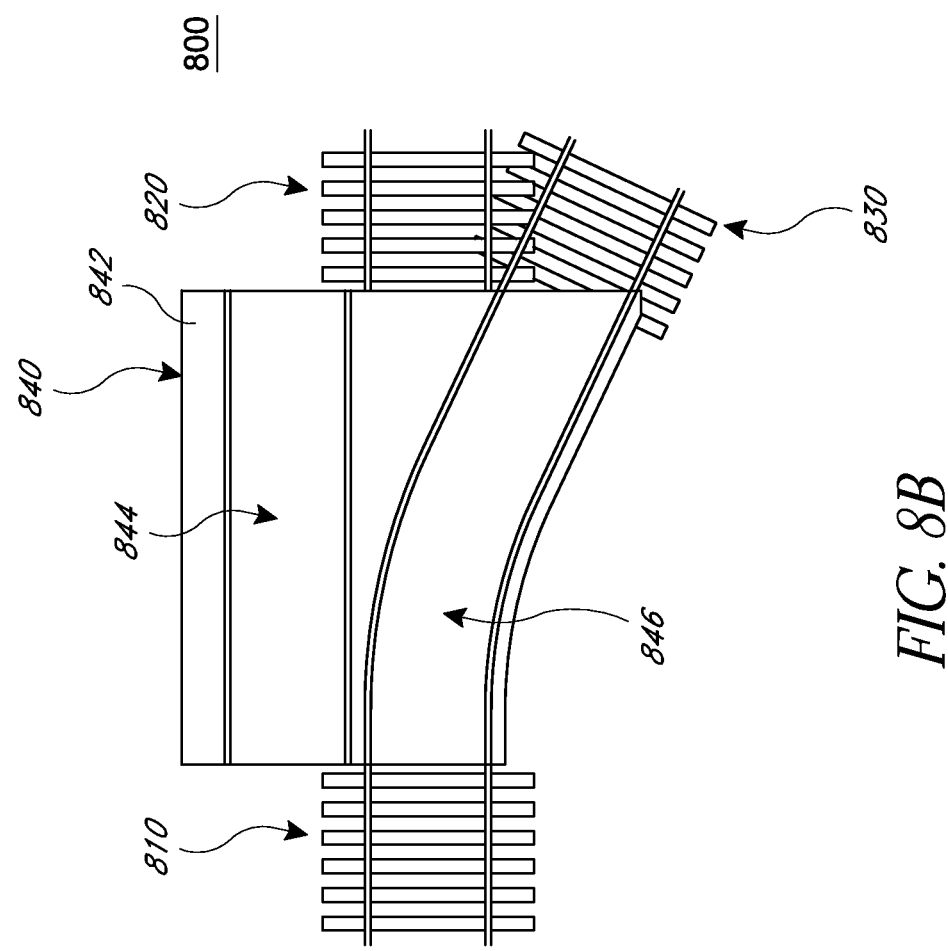
FIG. 8B is a plan view of the system of FIG. 8A showing the track switch in a second position interconnecting the first track segment and a third track segment.

As indicated by the arrow depicted in FIG. 8A, the platform 842 may be translated or moved relative to the first, second, and third track segments 810, 820, and 830 between the first position and a second position (shown in FIG. 8B). Because the first set of rail structures 844 and the second set of rail structures 846 are fixed relative to each other by the platform 842, translation of the platform causes both sets of rail structures 844 and 846 to move relative to the first, second, and third track segments 810, 820, and 830.

As shown in FIG. 8B, when translated or otherwise moved to the second position, the switch 840 may connect the third track segment 830 to the first track segment 810 via the second set of rail structures 846. In the second position, the second track segment 820 is not connected to the first track segment 810 by any rail structures of the switch 840. In this way, the switch 840 may be actuated to divert the path of the track 800 from a path between the first track segment 810 and the second track segment 820 to a path between the first track segment 810 and the third track segment 830, and vice versa. In some embodiments, an actuating mechanism translates the switch 840 between the first and second positions as illustrated in FIGS. 8A and 8B and may translate the switch between the second position and the first position. Suitable actuating mechanisms can include screw devices driven by a motor (e.g., a rotary motor), rack and pinion devices, and hydraulic devices, for example.

In some embodiments, the rail structures of the first, second, and third track segments 810, 820, and 830, and the first and second sets of rail structures 844 and 846 of the switch 840 each comprise double-headed rail structures, for example, any of the rail structures described above with reference to FIGS. 1-7. In this way, the switch 840 may be incorporated in a rail system that is configured to accommodate magnetic levitation vehicles and conventional rolling rail vehicles. Thus, the switch 840 may provide a means for diverting magnetic levitation vehicles and rolling vehicles along a track including any of the double-headed rail structures contemplated by this disclosure.

FIGS. 9A and 9B are plan views of a portion of a track 900 including a first track segment 910, a second track segment 920, and a third track segment 930. Each of the first track segment 910, the second track segment 920, and the third track segment 930 may include one or more rail structures (e.g., the rail structures described above with reference to FIGS. 1-7) for use with magnetic levitation vehicles and/or rolling vehicles. For example, the first track segment 910 includes a first rail structure 912 and a second rail structure 914, the second rail structure 920 includes a first rail structure 922 and a second rail structure 924, and the third rail structure 930 includes a first rail structure 932 and a second rail structure 934.

The first track segment 910 also includes a switch portion 911 configured to move between the second track segment 920 and the third track segment 930. In this way, the switch portion 911 can interconnect the first track segment 910 with either of the second track segment 920 and the third track segment 930. FIG. 9A illustrates the first track segment 910 connected to the second track segment 920 and FIG. 9B illustrates the first track segment 910 connected to the third track segment 930. Thus, the switch portion 911 can be utilized to divert a vehicle between two, or more, paths along a track. As shown, the switch portion 911 of the first track segment 910 is guided between rail stops 902 disposed on opposite sides of the first track segment 910.

In some embodiments, an actuator mechanism 950 can be coupled to the switch portion 911 by a link 952. In some embodiments, the link 952 may be coupled to each of the first rail structure 912 and the second rail structure 914 of the switch portion 911 such that the actuator mechanism 950 can move, bend, or otherwise manipulate the rail structures of the first track segment 910 between the second track segment 920 and the third track segment 930. The actuator mechanism 950 can include any suitable actuator, for example, a rack and pinion device.

As illustrated, the first rail structure 932 of the third track segment 930 can include a rotating rail portion or swing 936. The swing 936 can rotate at least between the configuration illustrated in FIG. 9A and the configuration illustrated in FIG. 9B. In this way, the swing 936 can be rotated to provide clearance for the switch portion 911 to move between the configuration illustrated in FIG. 9A and the configuration illustrated in FIG. 9B. Thus, the actuator mechanism 950 and link 952 can manipulate the switch portion 911 between the configuration illustrated in FIG. 9A and the configuration illustrated in FIG. 9B without abutting the first rail structure 932 of the third track segment 930. After the switch portion 911 has been manipulated to the configuration illustrated in FIG. 9B, the swing 936 can be rotated once more to form a continuous rail path from the first rail structure 902 of the first track segment 910 through the first rail structure 932 of the third track segment 930.

Figure 10A:
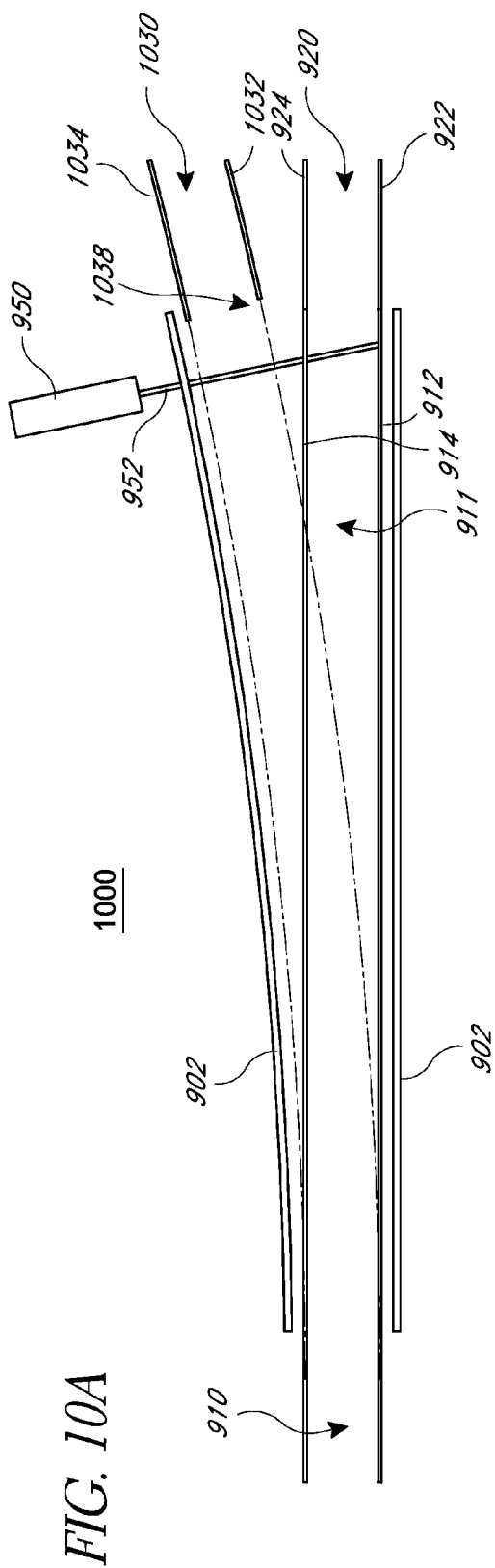
FIG. 10A is a plan view of a system including a track switch in a first position interconnecting a first track segment and a second track segment.
Figure 10B:
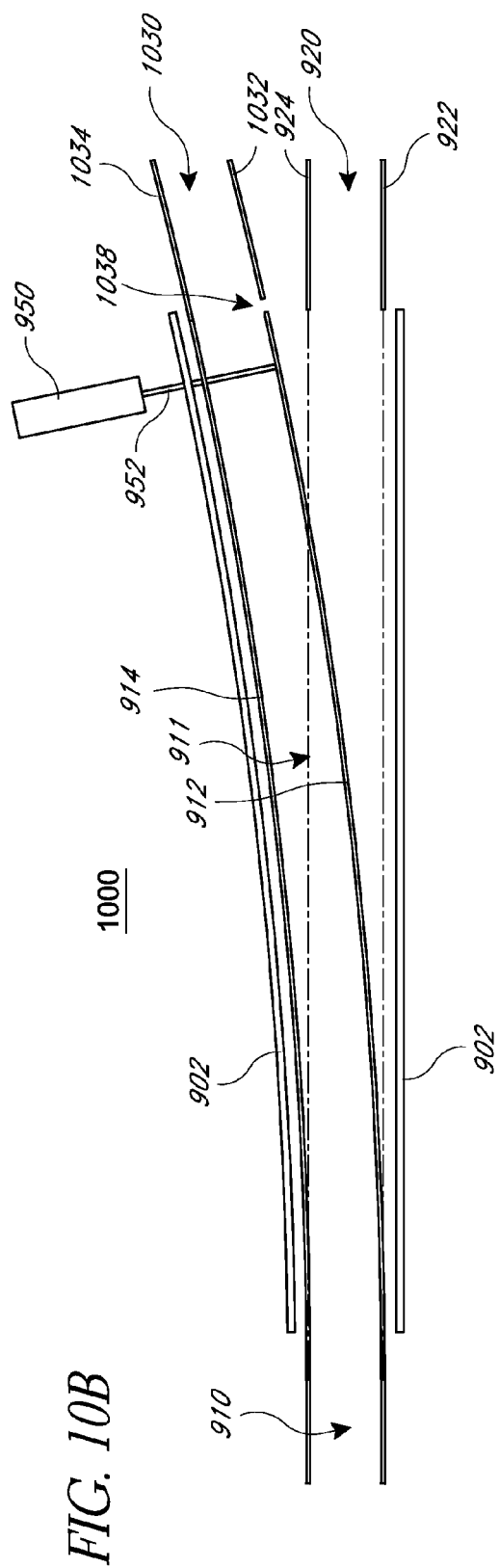
FIG. 10B is a plan view of the system of FIG. 10A showing the track switch in a second position interconnecting the first track segment and a third track segment.

FIGS. 10A and 10B are plan views of a portion of a track 1000 including the first track segment 910, the second track segment 920, and an alternative third track segment 1030. As with the track 900 of FIGS. 9A and 9B, the first track segment 910 includes the switch portion 911 that is coupled to the actuator mechanism 950 and the link 952. In this way, the switch portion 911 can be manipulated between a first configuration illustrated in FIG. 10A where the first track segment 910 is connected to the second track segment 920, and a second configuration illustrated in FIG. 10B where the first track segment 910 is connected to a third track segment 1030.

In contrast to the third track segment 930 of FIGS. 9A and 9B, the third track segment 1030 of FIGS. 10A and 10B does not include a swing. Instead, to allow for the switch portion 911 to move between the second track segment 920 and the third track segment 1030, the first rail structure 1032 of the third track segment 1030 is spaced to the right of the first rail structure 922 of the second track segment 920. In this way, the third track segment 1032 provides a gap 1038 through which the switch portion 911 may pass through when moving between the second track segment 920 and the third track segment 1030. As a result, track 1000 does not provide a continuous rail path from the first rail structure 902 of the first track segment 910 through the first rail structure 1032 of the third track segment 1030. However, a vehicle guided by two rail structures may nevertheless pass between the first track segment 910 and the third track segment 1030 by virtue of the continuous rail path formable between the second rail structure 914 of the first track segment 910 and the second rail structure 1034 of the third track segment 1030.

FIGS. 11A-11D are plan views of a portion of a track 1100 including the first track segment 910, the second track segment 920, and an alternative third track segment 1130. As with the track 900 of FIGS. 9A and 9B, the first track segment 910 includes the switch portion 911 that is coupled to the actuator mechanism 950 and the link 952. In the illustrated embodiment, a second actuator mechanism 1150 is also coupled to the switch portion 911 by a link 1152. In this way, the switch portion 911 can be manipulated between a first configuration illustrated in FIG. 11A where the first track segment 910 is connected to the second track segment 920, and a second configuration illustrated in FIG. 11D where the first track segment 910 is connected to a third track segment 1130. In some implementations, the switch portion 911 can be manipulated by the actuator mechanisms 950 and 1150

As shown in FIG. 11B, the actuator mechanisms 950 and 1150 can be spaced apart from one another such that they are configured to move, bend, or otherwise manipulate different sections of the switch portion 911 between various positions. For example, the actuator mechanism 1150 can manipulate a first section of the switch portion 911 that is proximal to second section of the switch portion 911 that can be manipulated by the other actuator mechanism 950. Thus, when transitioning between the first configuration illustrated in FIG. 11A and the second configuration illustrated in FIG. 11D, the first section can be manipulated toward the second configuration before the second section of the switch portion 911 is manipulated toward the second configuration. As a result of moving, bending, or otherwise manipulating the first section of the switch portion 911 before the second section, the first rail structure 914 of the first track segment 910 can clear the second rail structure 1132 of the third track segment 1130 when passing between the first configuration and the second configuration, as shown in FIG. 11C. That is to say, the actuator mechanism 1150 can be used to take up the slack of the switch portion 911 before the other actuator mechanism 950 moves the second more distal section of the switch portion 911 from the second track segment 920 to the third track segment 1130. In this way, the switch 911 can provide a continuous rail path between the rail structures 912 and 914 of the first track segment 910 and the rail structures 1132 and 1134 of the third track segment 1130 without requiring a gap or swing. Accordingly, the track 1100 may be preferable to the tracks of FIGS. 9A-10B.

Figure 12A:
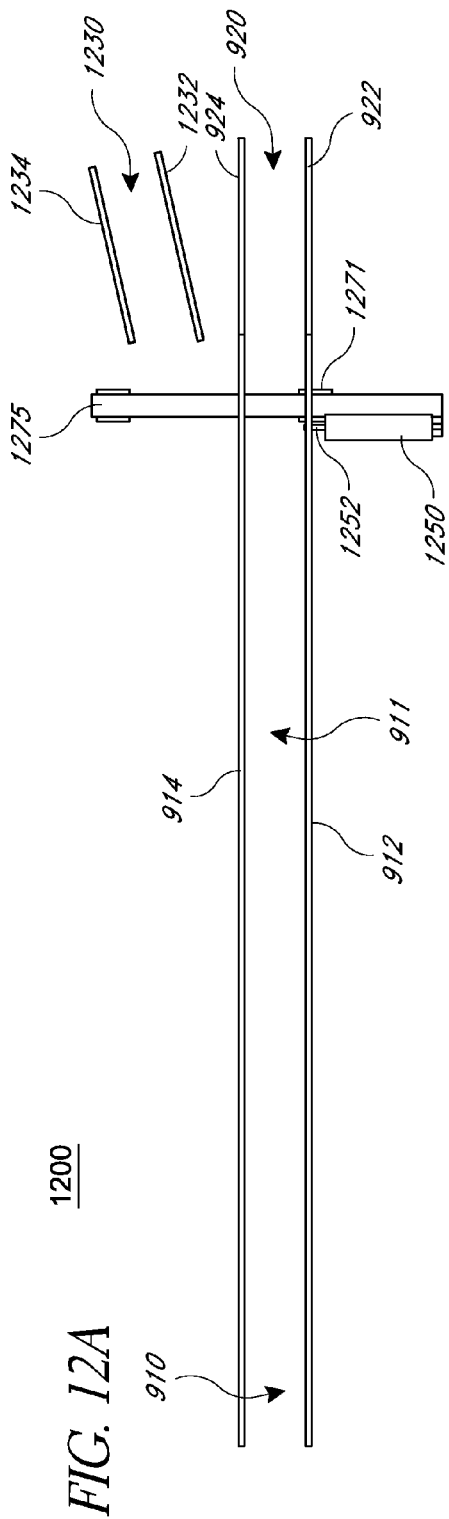
FIG. 12A is a plan view of a system including a track switch in a first position interconnecting a first track segment and a second track segment.
Figure 12B:
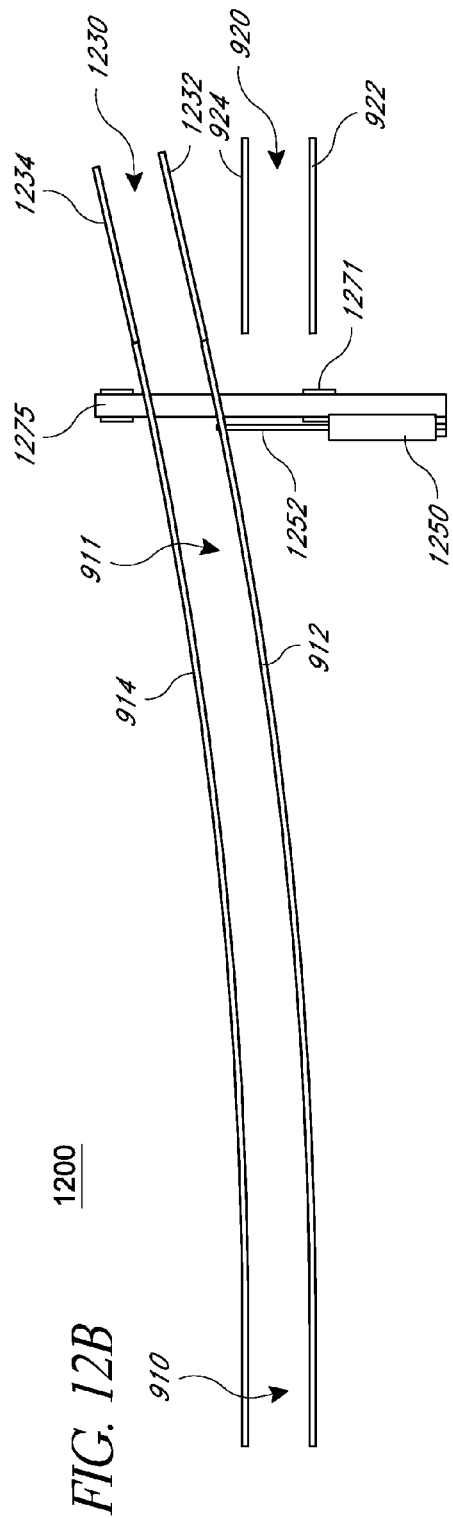
FIG. 12B is a plan view of the system of FIG. 12A showing the track switch bent from the position illustrated in FIG. 12A.

FIGS. 12A and 12B are plan views of a portion of a track 1200 including the first track segment 910, the second track segment 920, and an alternative third track segment 1230. As with the track 900 of FIGS. 9A and 9B, the first track segment 910 includes the switch portion 911 that is configured to move at least between the configurations illustrated in FIGS. 12A and 12B. The third track segment includes a first rail structure 1232 and a second rail structure 1234.

Still referring to FIGS. 12A and 12B, the track 1200 may include one or more linear actuator mechanisms 1250 coupled to the first track segment 910 by one or more links 1252. In some embodiments, the one or more links 1252 may be coupled to each of the first rail structure 912 and the second rail structure 914 of the switch portion 911 such that the actuator mechanism 1250 can move, bend, or otherwise manipulate the rail structures of the first track segment 910 between the second track segment 920 and the third track segment 1230. The actuator mechanism 1250 can include any suitable actuator, for example, a rack and pinion device.

Figure 12C:
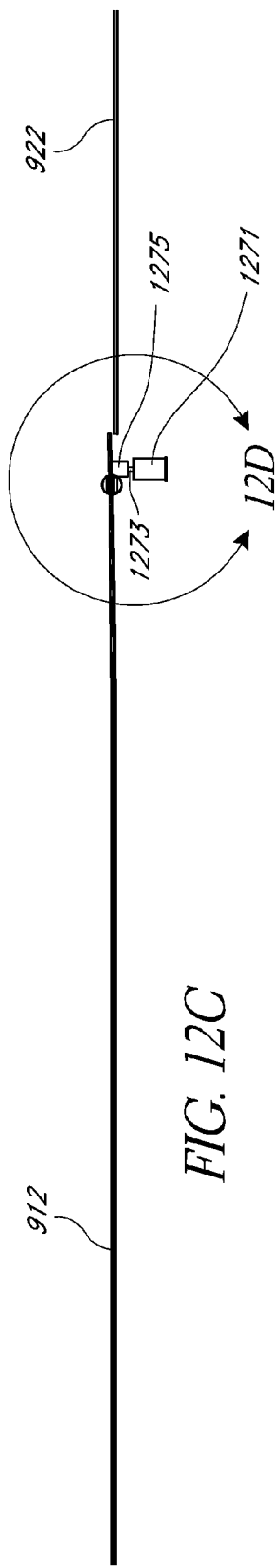
FIG. 12C is a side view of the system of FIG. 12A.
Figure 12D:
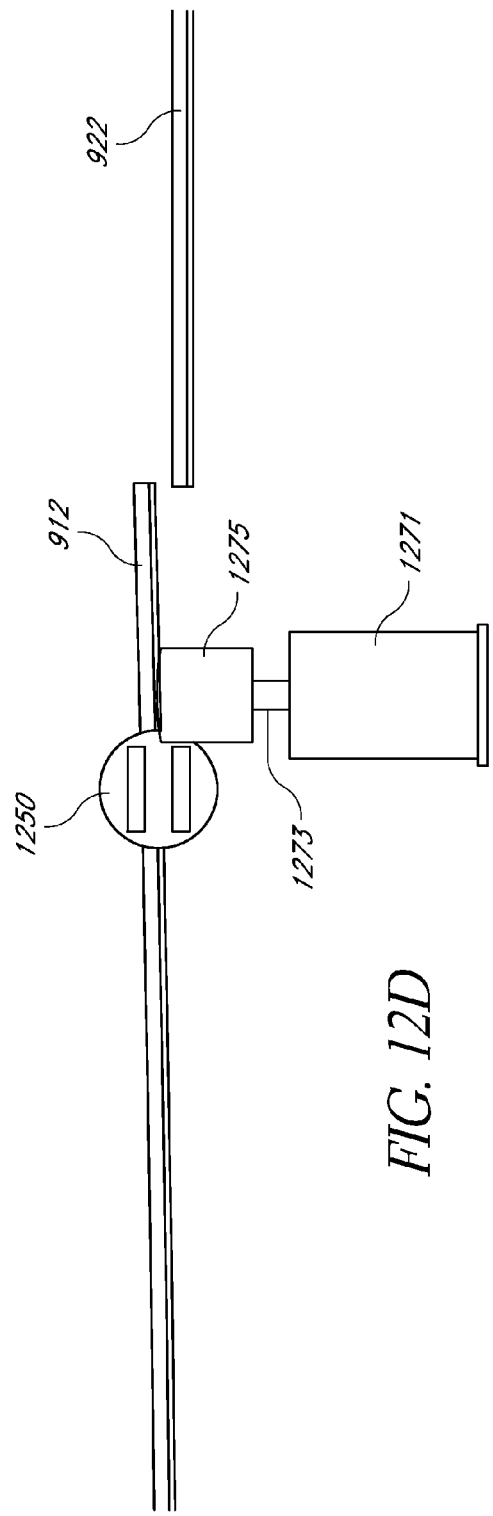
FIG. 12D is a close up view of a portion of FIG. 12C.

As illustrated, the first and second rail structures 912 and 914 of the first track segment 910 may be supported by a platform 1275 near the second track segment 920 and third track segment 1230. In some embodiments, each of the first and second rail structures 912 and 914 of the first track segment 910 may be secured relative to the platform 1275 such that the rail structures are secured relative to one another. In some embodiments, one or more lift actuators 1271 may be coupled to the platform 1275 by one or more actuator links 1273. The one or more lift actuators 1271 may raise and/or lower the rail structures 912 and 914 of the first track segment 910 relative to the second and third track segments, as shown in FIGS. 12C and 12D. In this way, the one or more lift actuators 1271 may raise or lift the switch portion 911 of the first track segment 910 above the first and second track segments 920 and 1230 such that the first and second rail structures 912 and 914 of the first track segment 910 can move between the configurations illustrated in FIGS. 12A and 12B without being obstructed by the second and/or third track segments 920 and 1230. That is to say, the one or more lift actuators 1271 may provide the clearance for the switch portion 911 to move between the second track segment 920 and the third track segment 1230.

Figure 13A:
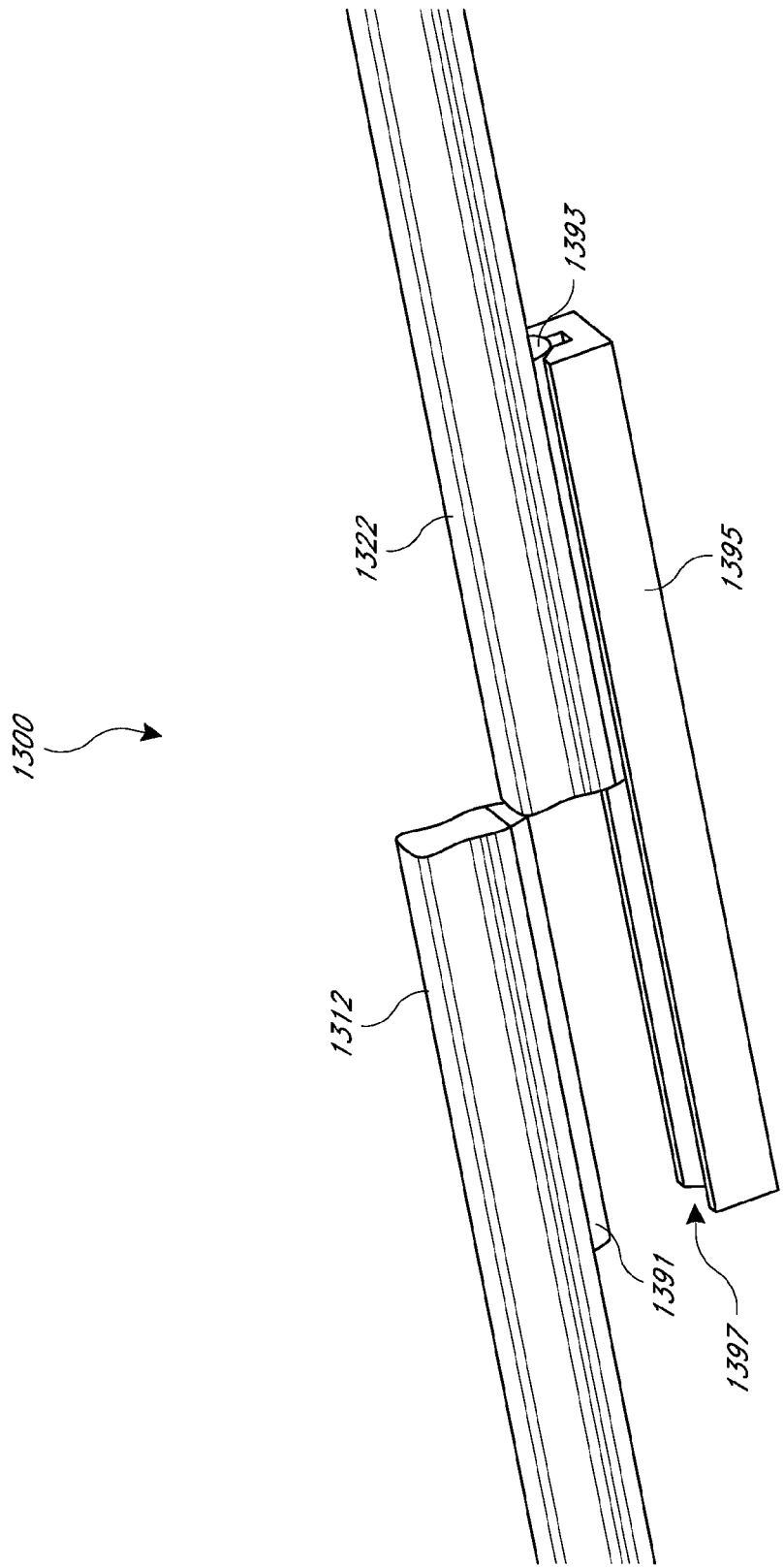
FIG. 13A is a perspective view of a system including a first rail structure, a second rail structure, and a cradle for orienting the first rail structure relative to the second rail structure.
Figure 13B:
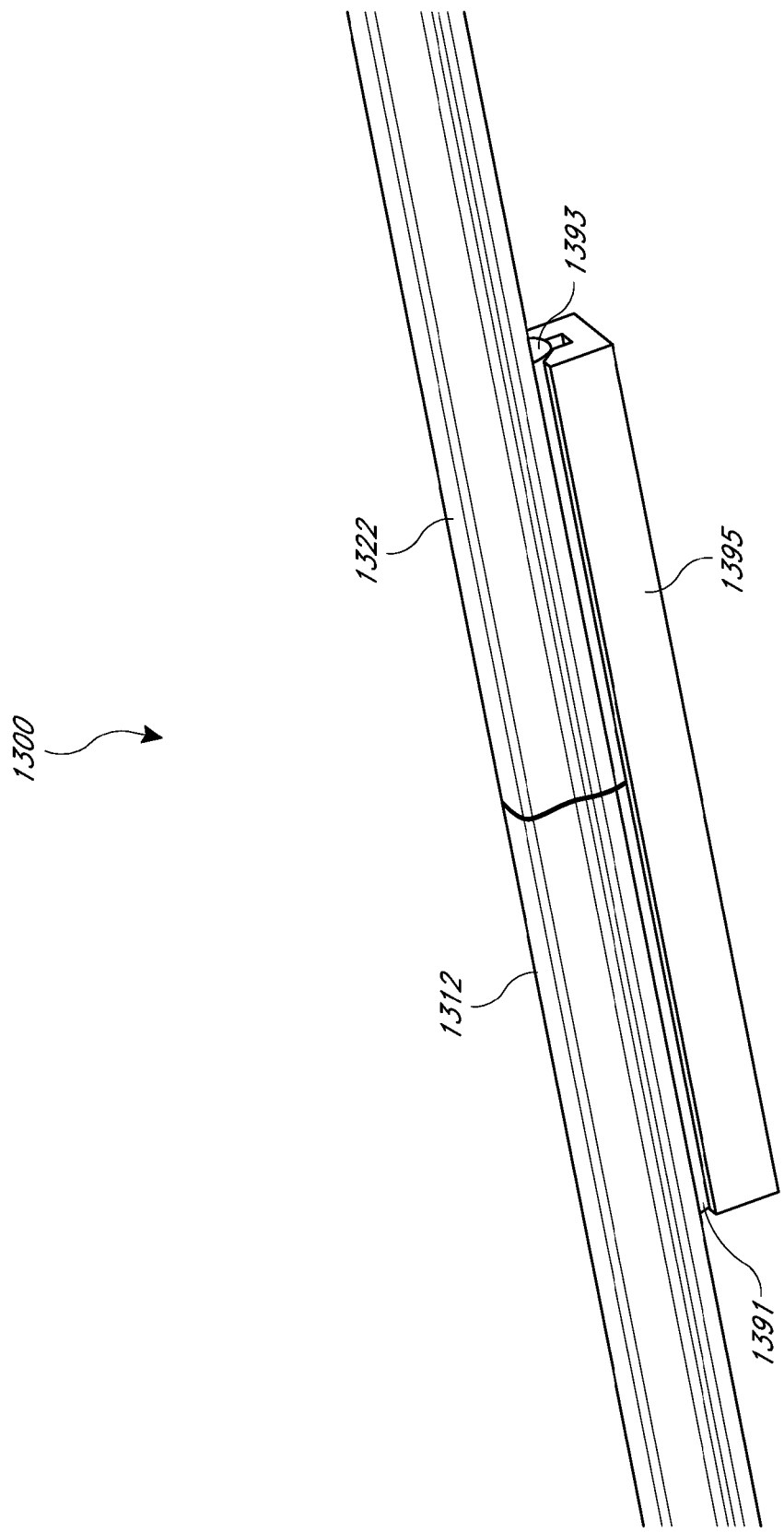
FIG. 13B is a perspective view of FIG. 13A showing a rail path formed between the first rail structure and the second rail structure.

FIGS. 13A and 13B are perspective views of a portion of a track 1300 including a first rail structure 1312 and a second rail structure 1322. In some embodiments, the rail structures 1312 and 1322 can include double-headed rail structures, for example, any of the double-headed rail structures disclosed herein.

Also illustrated in FIGS. 13A and 13B is a cradle 1395 including a longitudinally extending trough or receiving space 1397. The cradle 1395 may be configured to orient and/or position the rail structures 1312 and 1322 relative to one another to form a continuous rail structure path between the two rail structures as shown in FIG. 13B. That is to say, the cradle 1395 can join two or more rail structures to ensure that the position and slope of the track on either side of a joint or split are compatible with one another. In some embodiments, the first rail structure 1391 can include a lower protrusion 1391 and the second rail structure 1322 can include a lower protrusion 1393. The first and second lower protrusions 1391 and 1393 can be sized and shaped so as to complement the size and shape of the trough 1397. In this way, the cradle 1395 may inhibit and/or limit movement of the first rail structure 1312 relative to the second rail structure 1322 when the first and second lower protrusions 1391 and 1393 are received within the trough 1397. In some embodiments, the cradle 1395 may be incorporated with track systems including one or more lift actuators, e.g., track 1200 of FIGS. 12A-12D, to provide a catch or positioning structure to position the rail structures relative to one another in various switch positions or configurations.

While the above description has pointed out novel features of the disclosure as applied to various embodiments, the skilled person will understand that various omissions, substitutions, and changes in the form and details of the device or process illustrated may be made without departing from the scope of the disclosure.

What is claimed is:

1. A track for use with at least one of a magnetic levitation vehicle and a rolling vehicle having one or more wheels, the track comprising:
   a first head having a first lateral dimension;
   a second head having a second lateral dimension;
   a first connection portion extending between the first head and the second head and providing a path for a first source of magnetic flux through the first head and the second head, the first connection portion having a third lateral dimension that is less than the first lateral dimension of the first head;
   a first support structure extending from the second head; and
   a first base extending from the first support structure, wherein the first head, the connection portion, and the second head comprise a magnetizable material and are integrally formed, and wherein the first base and the first support structure comprise a non-magnetizable material.

2. The track of claim 1, wherein the third lateral dimension of the connection portion is less than the second lateral dimension of the second head.

3. The track of claim 2, wherein the second lateral dimension of the second head is greater than the first lateral dimension of the first head.

4. The track of claim 1, wherein the magnetizable material comprises at least one of steel and iron.

5. The track of claim 1, wherein the first head, the connection portion, and the second head comprise a magnetic material.

6. The track of claim 1, wherein the first head comprises an upper surface having a maximum lateral dimension sufficient to support a wheel of the rolling vehicle.

7. The track of claim 6, wherein the maximum lateral dimension of the upper surface is between 70 mm and 75 mm.

8. The track of claim 1, wherein a cross-sectional shape of the first head, the connection portion, and the second head is substantially polygonal.

9. The track of claim 1, wherein the first connection portion is tapered between the first head and the second head.

10. The track of claim 1, further comprising:
   a third head having a fourth lateral dimension;
   a fourth head having a fifth lateral dimension;
   a second connection portion extending between the third head and the fourth head and providing a path for a second source of magnetic flux through the third head and the fourth head, the second connection portion having a sixth lateral dimension that is less than the fourth lateral dimension of the third head;
   a second base, the second base being offset laterally from the first base; and
   a second support extending between the fourth head and the second base.

11. A source of magnetic flux for use with a rail structure having a first head having a first lateral dimension, a second head having a second lateral dimension, and a connection portion extending between the first head and the second head and providing a path for the source of magnetic flux through the first head and the second head, the connection portion having a third lateral dimension that is less than the first lateral dimension of the first head and the second lateral dimension of the second head, wherein a first support structure extends from the second head, and a first base extends from the first support structure, wherein the first head, the connection portion, and the second head comprise a magnetizable material and are integrally formed, and wherein the first base and the first support structure comprise a non-magnetizable material, the source of magnetic flux comprising:

a first upper portion having a first polarity and a second upper portion having the first polarity, the first upper portion and the second upper portion being spaced apart to receive at least a portion of the first head therebetween, wherein the first upper portion is magnetically attracted to the first head by a force that is greater than a magnetic attraction force between the first upper portion and the connection portion; and a first lower portion having a second polarity opposite of the first polarity, and a second lower portion having the second polarity, the first lower portion and the second lower portion being spaced apart to receive at least a portion of the second head therebetween, wherein the first lower portion is magnetically attracted to the second head by a force that is greater than a magnetic attraction force between the first lower portion and the connection portion.

12. The source of magnetic flux of claim 11, wherein the first upper portion comprises a surface oriented to face a first lateral facing surface of the first head, and wherein the second upper portion comprises a surface oriented to face a second lateral facing surface of the first head.

13. The source of magnetic flux of claim 11, wherein the first lower portion comprises a surface oriented to face a first lateral facing surface of the second head, and wherein the second lower portion comprises a surface oriented to face a second lateral facing surface of the second head.

14. The source of magnetic flux of claim 11, further comprising a controller configured to control a position of the source of magnetic flux relative to the rail structure.

* * * * *